US012651492B2

(12) United States Patent
Lombard et al.

(10) Patent No.: US 12,651,492 B2
(45) Date of Patent: Jun. 9, 2026

(54) DEVICE AND METHOD FOR HANDLING DATA ASSOCIATED WITH ENERGY CONSUMPTION OF A VEHICLE

(71) Applicant: VOLVO TRUCK CORPORATION, Gothenburg (SE)

(72) Inventors: Benoit Lombard, Villette-de-Vienne (FR); Emmanuel Estragnat, Sainte Foy les Lyon (FR); Jens Lundström, Holm (SE); Jerome Quelin, Villeurbanne (FR); Adam Stahl, Sävedalen (SE); Nils Odebo Länk, Gothenburg (SE); Nicolas Fruchard, Lyons (FR); Regis Bernasconi, Rontalon (FR); Fabrice Luchini, Fontaines St Martin (FR); Gilbert Rodrigues, Saint-Priest (FR)

(73) Assignee: VOLVO TRUCK CORPORATION, Gothenburg (SE)

(*) Notice: Subject to any disclaimer, the term of this patent is extended or adjusted under 35 U.S.C. 154(b) by 70 days.

(21) Appl. No.: 18/712,952

(22) PCT Filed: Nov. 2, 2022

(86) PCT No.: PCT/EP2022/080555

§ 371 (c)(1),
(2) Date: May 23, 2024

(87) PCT Pub. No.: WO2023/094125

PCT Pub. Date: Jun. 1, 2023

(65) Prior Publication Data

US 2025/0029433 A1 Jan. 23, 2025

(30) Foreign Application Priority Data

Nov. 23, 2021 (EP) .................................... 21210072

(51) Int. Cl.
*G07C 5/08* (2006.01)
*G07C 5/00* (2006.01)
*G07C 5/02* (2006.01)

(52) U.S. Cl.
CPC ........... *G07C 5/0816* (2013.01); *G07C 5/008* (2013.01); *G07C 5/02* (2013.01); *G07C 5/0808* (2013.01)

(58) Field of Classification Search
CPC ........ G07C 5/0816; G07C 5/008; G07C 5/02; G07C 5/0808; G05B 23/024;
(Continued)

(56) References Cited

U.S. PATENT DOCUMENTS 8,543,287 B2 * 9/2013 Stevens ................. F02D 19/026
701/34.2
10,192,448 B2 1/2019 Moreira-Matias et al.
(Continued)

FOREIGN PATENT DOCUMENTS

CN 110070245 A 7/2019
KR 20210061669 A 5/2021

OTHER PUBLICATIONS

Non-Final Office Action dated Aug. 6, 2024 in corresponding U.S. Appl. No. 18/057,009, 20 pages.
(Continued)

*Primary Examiner* — Sizo B Vilakazi
(74) *Attorney, Agent, or Firm* — Jeffri A. Kaminski; Venable LLP

(57) ABSTRACT

A device obtains modelling data associated with energy consumption of a model vehicle. The modelling data are generated by a digital model of the vehicle in operation. The device obtains operating data associated with energy consumption of the vehicle in operation. The device compares the operating data to the modelling data. Based on a result
(Continued)

of the comparing, the device detects a discrepancy between the operating data and the modelling data and associated with the energy consumption. The device evaluates the detected discrepancy associated with the energy consumption. The device triggers an operation when the discrepancy has been detected.

14 Claims, 15 Drawing Sheets

(58) Field of Classification Search
CPC ........... B60L 2260/54; B60W 50/0097; B60W 2050/0005
See application file for complete search history.

(56) References Cited

U.S. PATENT DOCUMENTS

| | | | | |
|---|---|---|---|---|
| 10,464,547 | B2 | 11/2019 | Park et al. | |
| 11,358,481 | B2 * | 6/2022 | Araki | B60L 50/72 |
| 2012/0066232 | A1 | 3/2012 | Engelhardt et al. | |
| 2013/0184901 | A1 * | 7/2013 | Wall | B60W 50/0097 701/3 |
| 2015/0241310 | A1 * | 8/2015 | Brown | G06Q 10/04 702/179 |
| 2020/0011687 | A1 | 1/2020 | Lindemann et al. | |
| 2021/0090358 | A1 * | 3/2021 | DiCarlo | G07C 5/0808 |
| 2021/0138927 | A1 | 5/2021 | Maeng et al. | |

OTHER PUBLICATIONS

Extended European Search Report in corresponding European Application No. 21210072.1 dated May 16, 2022 (7 pages).
International Search Report and Written Opinion of the International Searching Authority in corresponding International Application No. PCT/EP2022/080555 mailed Feb. 22, 2023 (13 pages).
European Communication pursuant to Article 94(3) EPC dated Jul. 29, 2025 in corresponding European Patent Application No. 22809477.7, 8 pages.

* cited by examiner

403. Alerts and reports

Dimensionality reduction clustering

Cluster statistics + modelling

DEVICE AND METHOD FOR HANDLING DATA ASSOCIATED WITH ENERGY CONSUMPTION OF A VEHICLE

CROSS-REFERENCE TO RELATED APPLICATIONS

This application is a U.S. National Stage application of PCT/EP2022/080555, Nov. 2, 2022 and published on Jun. 1, 2023 as WO 2023/094125, which claims the benefit of European Patent Application No. 21210072.1, filed Nov. 23, 2021, all of which are hereby incorporated by reference in their entireties.

TECHNICAL FIELD

The present disclosure relates generally to a device and a method performed by the device. More particularly, the present disclosure relates to for handling data associated with energy consumption of a vehicle in operation.

The invention may be applied in vehicles such as trucks, busses, and construction equipment. The invention may be applied in at least partly electrical heavy-duty vehicles, such as trucks, busses and construction equipment etc. The invention may also be used in other vehicles such as trailers, wheel loaders, articulated haulers, excavators, backhoe loaders, passenger cars, marine vessels etc. It may also be applied in electrical systems of e.g. electrically operated vessels and in various industrial construction machines or working machines. The invention is applicable in fully electrically operated vehicles as well as in hybrid vehicles, comprising also a combustion engine, and in vehicles operated using only a combustion engine.

The invention may be applied in partly autonomous vehicle, a fully autonomous vehicle or in a non-autonomous vehicle.

BACKGROUND

The cost of energy is one of the highest cost centres for vehicle users. Monitoring fuel consumption is key for them and is now possible thanks to the connected trucks that allows to retrieve operational data on a regular basis (daily to minute). In regard of the volume of generated data, the number of factors influencing the energy consumption, e.g. mission, user behavior, vehicle configuration, trailers, tyres, etc., makes it very complex and time consuming to detect discrepancies and understand the root cause of the energy deviation.

Therefore, there is a need to at least mitigate or solve this issue.

SUMMARY

An object of the invention is to improve handling of energy consumption of a vehicle.

According to a first aspect, the object is achieved by a method performed by a device and is for handling data associated with energy consumption of a vehicle in operation. The device obtains modelling data associated with energy consumption of a model vehicle. The modelling data are generated by a digital model of the vehicle in operation. The device obtains operating data associated with energy consumption of the vehicle in operation. The device compares the operating data to the modelling data. Based on a result of the comparing, the device detects a discrepancy between the operating data and the modelling data and associated with the energy consumption. The device evaluates the detected discrepancy associated with the energy consumption and triggers an operation when the discrepancy has been detected. By the provision of the method, handling of energy consumption of a vehicle is improved.

According to one embodiment, the step of evaluating the detected discrepancy associated with the energy consumption comprises one or more of:

- evaluating energy consumption of the vehicle in operation;
- detecting malfunction of the vehicle in operation;
- determining a reason for the discrepancy;
- determining a vehicle configuration change; and
- determining a vehicle operation change.

An advantage of this embodiment may that the evaluation of the detected discrepancy is wide and provides multiple possibilities.

According to a further embodiment, the operation comprises one or more of:

- providing information associated with the discrepancy;
- triggering an alert;
- initiating scheduling of a service operation; and
- requesting input from a user of the vehicle in operation.

An advantage of this embodiment may be that the possibility to handle the energy consumption of the vehicle is improved. The operation may be a variety of different operations which makes it possible to tailor the operation to a specific application, to a user requirement etc. With the operation, the discrepancy in energy consumption may be easy to discover by an operator or user.

According to another embodiment, the modelling data and the operating data may be both based on static data and/or dynamic data. An advantage of this may be that the basis for the modelling data and the operating data may be based on a type of data that is suitable for the method, data that provides an accurate and high-quality basis for the evaluation of the detected discrepancy. The modelling data may be for one or more vehicle configurations, and the one or more vehicle configurations may comprise different vehicle components and/or different amounts of vehicle components.

According to a further embodiment, the device may obtain a statistical distribution of the modelling data. The device may compare the operating data to the modelling data by comparing operating data to the statistical distribution of the modelling data to determine if the operating data is according to the statistical distribution or not. Hereby an improvement in that the comparing is made with increased accuracy.

According to another embodiment, the step of evaluating the detected discrepancy associated with the energy consumption may comprise that the device determines a user anticipation score for a user of the vehicle in operation. The user anticipation score may be:

user anticipation score ~

$$f\left(\frac{\text{w\_overall}}{W^{\alpha}, B^{\delta}, S^{\zeta}}\right),$$

where

W: weight impact $\sim\alpha^*w_{light}+\beta^*w_{medium}+\gamma^*w_{full}$ or an actual weight transported B: brake impact ~

$$\max\left(\frac{\text{brakes} - \text{stops}}{\text{stops}}, \text{brake\_max}\right)$$

S: speed impact ~

$$\frac{v - v_{min}}{v_{max} - v_{min}}$$

α, β, γ, δ, ε, ζ, $w_{overall}$, brake_max: real value scalar parameters w_overall: overall weight brake_max: max limit for a brake impact.

*f*: a normalized sigmoid function that maps any real value to a value between 0 and 1

$w_{light}$, $w_{medium}$, $w_{full}$: a ratio of km driven with light, medium and full weight load respectively v: an average speed and speeds outside $v_{min}$ or $v_{max}$ will be clipped to those V min or values.

An advantage of the user anticipation score may be that the user anticipation score may be linked to a specific action to be performed, a target to be reach and a potential gain in energy reduction if the target is reached.

According to another embodiment, the step of evaluating the detected discrepancy associated with the energy consumption may comprise that the device determines a user eco score for a user of the vehicle in operation. The user eco score may be:

eco score ~

$$f\left(\frac{w_{overall} * W^{\eta}}{O^{\theta} * N^{K} * S^{\mu}}\right),$$

where

W: weight impact ~$\alpha * w_{light} + \beta * w_{medium} + \gamma * w_{full}$ or actual weight transported O: overload impact ~

$$\frac{1}{\varphi} * \frac{\text{t\_overload}}{\text{t\_total}}$$

and/or topography impact.

N: not in green zone impact ~

$$\frac{1}{\xi} * (\max(\min\left(\frac{l_{notgreen} - l_{avg}}{l_{avg}}, 0\right), 1))$$

S: speed impact ~

$$\frac{v - v_{min}}{v_{max} - v_{min}}$$

η, θ, κ, μ, φ: real value scalar parameters $w_{overall}$: an overall weight

φ, ξ: normalization factors

*f*: a normalized sigmoid function that maps any real value to a value between 0 and 1

$w_{light}$, $w_{medium}$, $w_{full}$: a ratio of km driven with light, medium and full weight, load respectively $$\frac{\text{t\_overload}}{\text{t\_total}}:$$

a ratio of time spent in overload.

l_notgreen: liters per 100 km spent above the green zone $l_{avg}$: liters per 100 km v: an average speed and speeds outside $v_{min}$ or $v_{max}$ will be clipped to those values.

An advantage of the user eco score may be that the user eco score may be linked to a specific action to be performed, a target to be reach and a potential gain in energy reduction if the target is reached.

According to a further embodiment, the digital model of the vehicle in operation may be implemented on a remote server or in the vehicle. An advantage of implementing the digital model on a remote server may be that it may be easy to make changes, corrections to the digital model and that this may not affect the operation of the vehicle. An advantage of implementing the digital model in the vehicle may be that the transmission path for data between the vehicle and the digital model may be short which reduces the risk for data loss and transmission delay.

According to another embodiment, the digital model may be configured based on historic operating data obtained from a fleet of vehicles. A Machine Learning (ML) algorithm may be used when configuring the digital model. An advantage of using historic operating data is that the evaluation may be that the accuracy of the digital model may be improved.

According to a further embodiment, vehicles comprised in the fleet of vehicles may have similar mission and configuration. An advantage of this may be that the accuracy of the digital may be improved. Data from vehicles having different mission and configuration may not be used for the digital model, which may affect the digital model negatively.

According to another embodiment, the vehicles comprised in the fleet of vehicles may be selected from a main fleet of vehicles comprising vehicles having both similar and different mission and configuration. The selection of fleets of vehicles with both similar and different mission and configuration may be larger than of a fleet of vehicles with only similar mission and configuration. Thus, it may be easier to find a fleet of vehicle that can be used for the digital model.

According to a second aspect of the invention, the object is achieved by a device for handling a data associated with energy consumption of vehicles is configured to perform the steps of the method according to the first aspect. The device is configured to perform the steps of the method described in the first aspect. The device may be an electronic device comprising processing circuitry for performing the method. The device may be a computer. The central unit may comprise hardware or hardware and software. Advantages and effects of the device are largely analogous to the advantages and effects of the method. Further, all embodiments of the method are applicable to and combinable with all embodiments of the device, and vice versa.

According to a second aspect of the invention, the object is achieved by a vehicle that comprises a device according to the second aspect. Advantages and effects of the vehicle are largely analogous to the advantages and effects of the method. Further, all embodiments of the method are applicable to and combinable with all embodiments of the vehicle, and vice versa.

According to a second aspect of the invention, the object is achieved by a computer program that comprises program code means for performing the steps of the method of the first aspect when the computer program is run on a computer. Advantages and effects of the computer program are largely analogous to the advantages and effects of the method. Further, all embodiments of the method are applicable to and combinable with all embodiments of the computer program, and vice versa.

According to a second aspect of the invention, the object is achieved by a computer readable medium that carries a computer program comprising program code means for performing the steps of the method of the first aspect when the computer program is run on a computer. Advantages and effects of the computer readable medium are largely analogous to the advantages and effects of the method. Further, all embodiments of the method are applicable to and combinable with all embodiments of the computer readable medium, and vice versa.

The present invention is not limited to the features and advantages mentioned above. A person skilled in the art will recognize additional features and advantages upon reading the following detailed description.

BRIEF DESCRIPTION OF THE DRAWINGS

With reference to the appended drawings, below follows a more detailed description of embodiments of the invention cited as examples.

In the drawings.

The drawings are not necessarily to scale, and the dimensions of certain features may have been exaggerated for the sake of clarity. Emphasis is instead placed upon illustrating the principle.

DETAILED DESCRIPTION OF EXAMPLE EMBODIMENTS OF THE INVENTION

Figure 1:
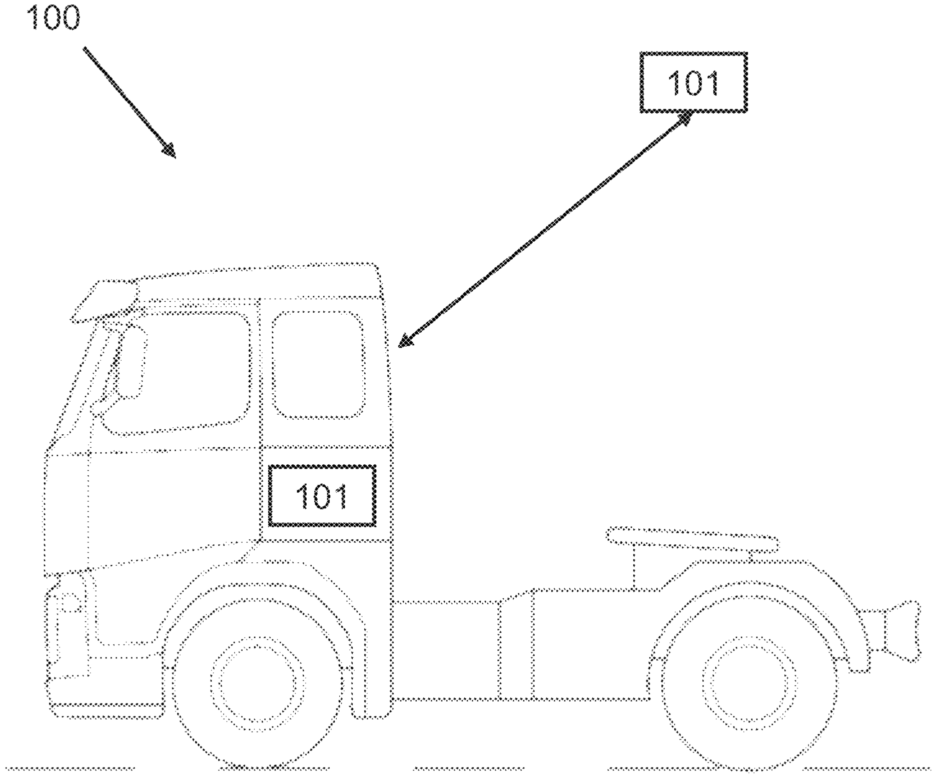
FIG. 1 is a schematic drawing illustrating a vehicle.

FIG. 1 illustrates a vehicle 100. The vehicle 100 may be an at least partly electrical heavy-duty vehicles, such as truck, bus, construction equipment, trailer, wheel loader, excavator, passenger car, marine vessel, working machine etc. The vehicle 100 may be a fully electrically operated vehicle as well as a hybrid vehicle, comprising also a combustion engine, and a vehicle only comprising a combustion engine. The vehicle 100 may be a fully autonomous vehicle, an at least partly autonomous vehicle or a non-autonomous vehicle.

Directions as used herein, e.g. horizontal, vertical, lateral, relate to when the vehicle 100 is standing on flat ground. For convenience, the vehicle 100 as shown in FIG. 1 is defined herein with respect to a Cartesian coordinate system, wherein a longitudinal extension of the vehicle 100 extends along an x-axis, a transverse extension the vehicle 100 extends along a y-axis and a height extension of the vehicle 100 extends along a z-axis of the Cartesian coordinate system. It shall however be noted that directions, locations, orientations etc. may be expressed in any other type of coordinate system.

The vehicle 100 may be a vehicle in operation. It may be in operation in that the engine is running and the vehicle is running or standing still.

The vehicle 100 may be used by a user. The user may be a driver, an operator etc. of the vehicle 100. For example, if the vehicle 100 is an at least partly autonomous vehicle, then it may be operated or driven by a user. In another example, if the vehicle 100 is manually operated, i.e. non-autonomous vehicle, then the vehicle 100 may be operated or driven by a driver. The user of the vehicle 100 may be located inside the vehicle 100 when operating it, or he/she may be remotely located from the vehicle 100.

The vehicle 100 may be comprised in a vehicle fleet or fleet of vehicles. In other words, the vehicle 100 may be comprised in a group of vehicles, comprising a plurality of vehicles.

The vehicle 100 may have a vehicle configuration. The vehicle configuration may describe or comprise the components of the vehicle 100. The components of the vehicle 100 may be for example engine, steering system, axel ratio, roof deflector, computer software, actuators, sensors etc. The components of the vehicle 100 may affect the energy consumption of the vehicle 100 in various degree.

Examples of actuators in a vehicle 100 may be:

A fan in front of the vehicle 100 to promote heat dissipation in cooler and engine compartment, and/or An air compressor feeding the vehicle 100 with compressed air used for engine brakes, door opening, urea spray quality, blow gun in cabin etc., and/or An air conditioning compressor, and/or A power steering pump, and/or An oil pump, etc.

Examples of sensors in a vehicle 100 may be:

An oil temperature sensor, and/or

An oil pressure sensor, and/or

A boost pressure pression sensor, and/or

A boost pressure temperature sensor, and/or

An exhaust Gas Recirculation flow meter or sensor, and/or

An inlet air flow meter or sensor.

The components may be added to the vehicle 100 when it is being manufactured, after the vehicle 100 has been in operation for a time period for after a number of driven kilometres etc. Thus, the components may be added to or mounted in the vehicle 100 at different times. The components added to the vehicle 100 after it has been in operation for some time/kilometres may be referred to as add-on components or add-on features.

The vehicle 100 may have a start configuration or default configuration from the start and when it is being dispatched from the vehicle manufacturing facility. The start configuration may change during the lifetime of the vehicle 100. For example, a component may be exchanged by the same or similar component, for example a newer and improved version of the same component, a component may be exchanged by a different component, a completely new component may be added to the vehicle 100 which provides the vehicle 100 with a completely new feature etc. The vehicle configuration may affect the energy consumption of the vehicle 100. For example, the lack of a roof deflector, or a deflector badly adjusted, a not enough aerodynamic vehicle body or trailer having an aerodynamic below an aerodynamic threshold, a tire pressure being below a pressure threshold etc. may cause increased energy consumption of the vehicle 100. The vehicle 100 may have a start configuration with a certain number of components, and where all or only some of the components are activated and others are deactivated. For example, the vehicle 100 may comprise actuators that are deactivated, i.e. switched off, in one configuration and that are activated, i.e. switched on, in another configuration.

A device 101 is illustrated in FIG. 1. The device 101 may be comprised in the vehicle 100 or it may be a remote server or comprised in a remote server. A part of the device 101 may be comprised in the vehicle 100 and another part of the vehicle device 101 may be comprised in a remote server. These two alternative locations of the device 101 are illustrated with the boxes with reference number 101 in FIG. 1. A remote server may be referred to as an offboard device. If the device 101 is comprised in the vehicle 100 it may be located at any suitable location in the vehicle 100. If the device 101 is a remote server or comprised in a remote server, then the device 101 is adapted to be connected to the vehicle 100 via a communication link, e.g. wired or wirelessly. The remote server may be located at any suitable distance from the vehicle 100. For example, the remote server may be in close proximity to the vehicle 100, it may be a cloud server etc. The device 101 may be an electronic control unit comprising processing circuitry for performing the method described herein. The device 101 may be a computer. The device 101 may comprise hardware or hardware and software. The device 101 may comprise a processor, memory, transmitter, receiver etc. The device 101 may comprise a digital model of the vehicle in operation, or it may be adapted to obtain data generated from the digital model of the vehicle 100 in operation. The device 101 will be described in more detail later.

Figure 7:
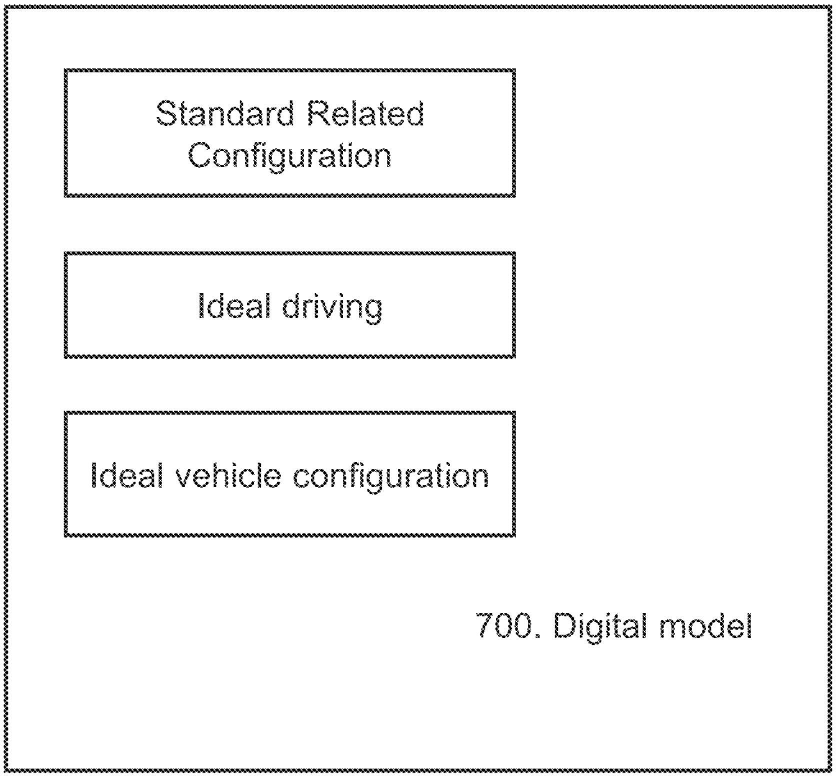
FIG. 7 is a schematic drawing illustrating a digital model.

Before describing the method for handling data associated with energy consumption of a vehicle 100 in operation, the term digital model will be described in more detail. A digital model may be referred to as a digital twin. A digital twin may be a digital representation of a physical or real object or process. In the context of the present invention, the digital twin may be a digital representation of the vehicle 100 in operation. The digital twin may be configured based on historic data from a vehicle fleet. A ML algorithm may be used when configuring the digital model based on historic data. The historic data may be referred to as training data used by the ML algorithm. An advantage of using the ML algorithm for configuring the digital model may be that it is an efficient algorithm, its time consumption is low and it provides outputs and results of high accuracy, i.e. accuracy above a threshold. The digital twin may represent an ideal vehicle for example in terms of fuel consumption, driving behavior, vehicle configuration, components comprised in the vehicle 100 etc. The digital twin may be implemented in the device 101, or the device 101 may be adapted to obtain data from another device on which the digital twin is implemented, e.g. a cloud device, a central device etc. More detailer regarding the digital model is provided later when FIG. 7 is described.

Figure 2:
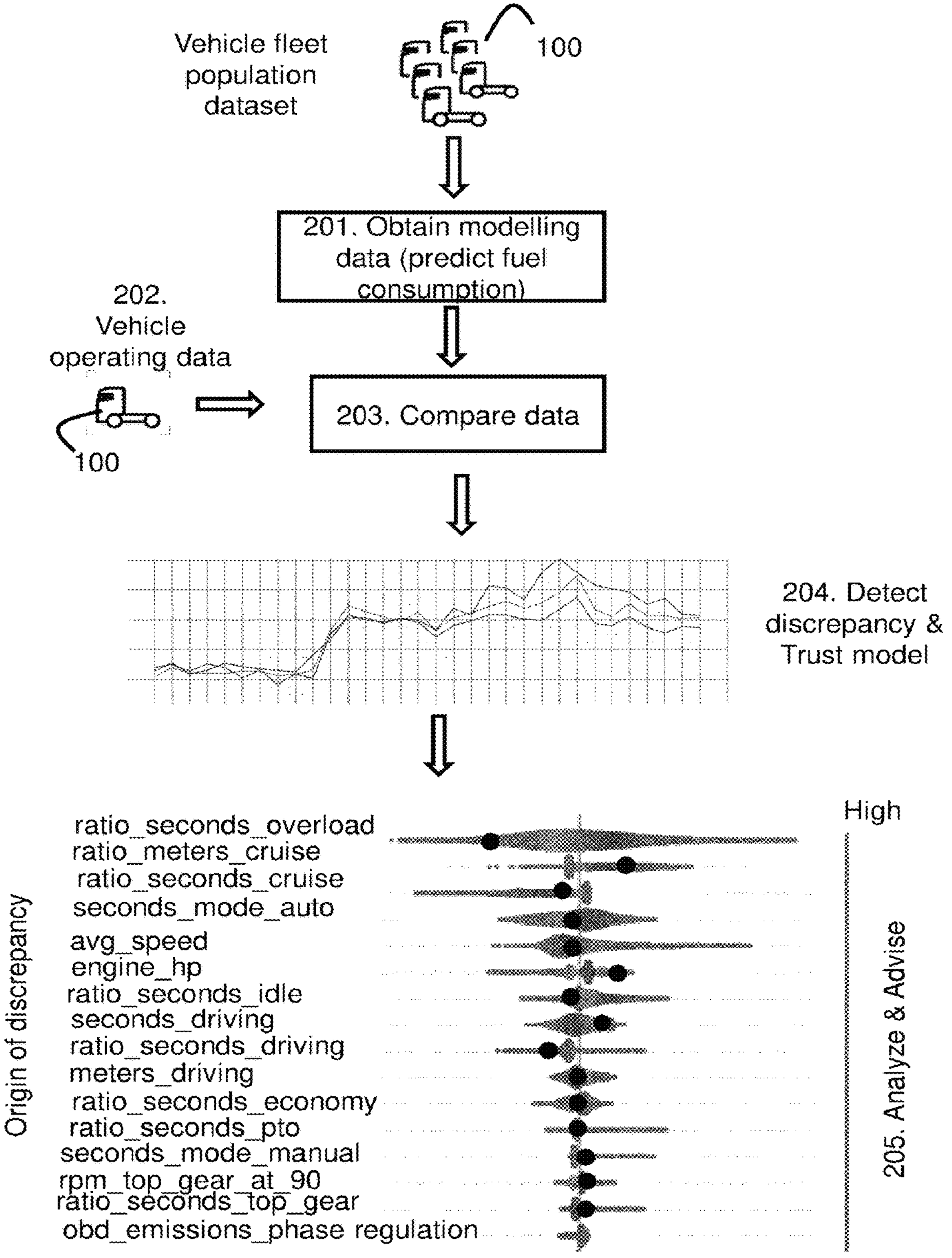
FIG. 2 is a flow chart illustrating a method.

FIG. 2 is a flow chart illustrating a method performed by the device 101 for handling data associated with energy consumption of a vehicle 100 in operation. Before the method is performed, it is assumed that the device 101 has access to a dataset from a vehicle fleet. The dataset may be a historic data set comprising data for a vehicle fleet previously obtained. The fleet of vehicles may be described as a plurality of vehicles. In FIG. 2, the vehicles comprised in the vehicle fleet, may have the same mission and configuration. An example of the configuration may be aerodynamics and tires, engine and powertrain etc.

In step 201, the device 101 obtains modeling data associated with energy consumption of a model vehicle. The model vehicle may be described as an ideal vehicle, i.e. a model or ideal representation of the vehicle 100 in operation. The modelling data are generated by the digital model of the vehicle 100 in operation. The modeling data may be described as a prediction of fuel consumption of the model vehicle, i.e. what the fuel consumption of the model vehicle would have been. The modelling data may be a prediction of energy consumption of the model vehicle having different configurations, for example the start configuration, a later configuration, a changed configuration, a future configuration etc. Thus, modeling data for different vehicle configurations may be compared to determine which vehicle configuration which is associated with the lowest, best or required energy consumption of the vehicle 100. The modelling data may be obtained using one or more digital twins.

In step 202, the device 101 obtains operating data from the vehicle in operation. The operating data may be real data obtained during operation of the vehicle 100. Obtaining operating from the vehicle 100 in operation is possible thanks to connected vehicles. Connected vehicles enables to obtain or retrieve operating data for example on a regular basis, e.g. weekly, daily, minute etc. The volume of the operating data is large, which makes it complex and time consuming to handle manually. Machine learning is therefore used herein in order to handle the large volume of data, and this will be described in more detail later.

In step 203, the device 101 compares the modeling data and the operating data. For example, the device 101 compares the predicted fuel consumption of the model vehicle with the real fuel consumption of the vehicle 100 in operation. The comparison in step 203 may comprise a first comparison of the predicted fuel consumption of the model vehicle with a first vehicle configuration with the real fuel consumption of the vehicle 100 in operation, a second comparison of the predicted fuel consumption of the model vehicle with a second vehicle configuration with the real fuel consumption of the vehicle 100 in operation etc. The comparison in step 203 may comprise to compare the result of the first comparison and the second comparison to determine an indication of which vehicle configuration is associated with the lowest, best or required energy consumption. The comparison in step 203 may be done taken a driver behavior into account. With this, the device 101 may provide an indication of the effect of the vehicle configuration(s) for a specific driver behavior may be. The comparison may be done for one or multiple driving conditions, e.g. different weather conditions, vehicle load etc.

In step 204, the device 101 detects a discrepancy between the modelling data and the operating data, if present. The device 101 may also generate a trust model. The trust model will be described in more detail with reference to FIG. 9.

In step 205, the device evaluates and analyses the detected discrepancy. An output of step 205 may be an advise related to how to reduce or overcome the discrepancy, it may be information indicating an origin of the discrepancy etc. An output of step 205 may be an indication of which vehicle configuration is associated with the lowest, best or required energy consumption etc. Consequently, the device 101 may determine which features that may be added to the vehicle 100 and at the same time does not involve an energy consumption above a threshold, or which features that may be activated or deactivated. The result of step 205 may be an indication of what the energy consumption would have been with the different vehicle configurations. The result of step 205 may be an indication of what the energy consumption would have been and/or will be with the different vehicle configurations and for e.g. a certain driver behavior, with different driving conditions etc.

The evaluation and analysis in step 205 may comprise to perform root cause analysis in order to determine the root cause of the discrepancy or to determine an indication of the root cause of the discrepancy. Some examples of root causes may be:

Leakage in fluid circuits.

Fluid cooling system not efficient due to for example dust, clogging etc.

Sensor failures etc.

Figure 3:
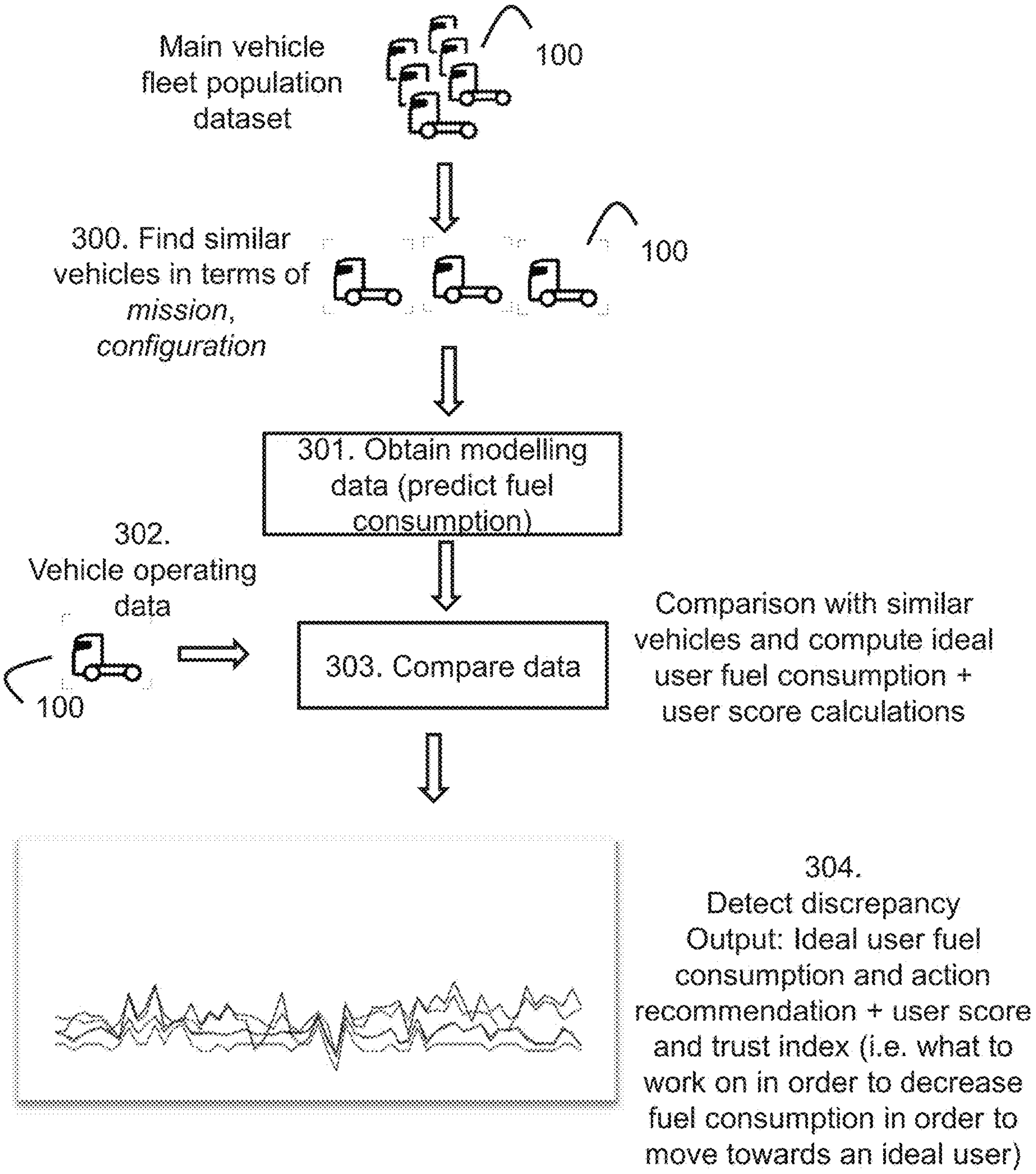
FIG. 3 is a flow chart illustrating a method.

FIG. 3 is a flow chart illustrating a method performed by the device 101 for handling data associated with energy consumption of a vehicle 100 in operation. Before the method is performed, it is assumed that the device 101 has access to a dataset from a main vehicle fleet or a first vehicle fleet. The dataset may be a historic data set comprising data for a vehicle fleet previously obtained. The vehicles comprised in the main vehicle fleet may have both similar and different mission and configuration. An example of the configuration may be aerodynamics and tires, engine and powertrain etc. In step 300, the device 101 finds vehicles that are similar in terms of mission and configuration in the main vehicle fleet. Thus, the device 101 selects the vehicles that are similar in terms of mission and configuration. In step 300, the device 101 selects a sub-set of the main data set, it selects a second dataset from the first data set. After step 300 has been performed, the device 101 has a dataset that is similar to the dataset that is at the start of the method in FIG. 2 and that is for vehicles that have the same mission and configuration. In step 301, the device 101 obtains modeling data associated with energy consumption of a model vehicle. The model vehicle may be described as an ideal vehicle. The model vehicle may be described as an average of the vehicles in the vehicle fleet, possibly optimized. The modelling data are generated by the digital model of the vehicle 100 in operation. The digital model may be configured using a ML algorithm. The digital model may be configured using a ML algorithm and using a training data set, e.g. historic operating data from a fleet of vehicles. The modeling data may be described as a prediction of fuel consumption of the model vehicle, i.e. what the fuel consumption of the model vehicle would have been. The modelling data may be a prediction of energy consumption of the model vehicle having different configurations, for example the start configuration, a later configuration, a changed configuration, a future configuration etc. Thus, modeling data for different vehicle configurations may be compared to determine which vehicle configuration which is associated with the lowest, best or required energy consumption of the vehicle 100.

In step 302, the device 101 obtains operating data from the vehicle in operation. The operating data may be real data obtained during operation of the vehicle 100.

In step 303, the device 101 compares the modeling data and the operating data. For example, the device 101 compares the predicted fuel consumption of the model vehicle with the real fuel consumption of the vehicle 100 in operation. In step 303, the device 101 makes a comparison with similar vehicles, via the digital model. The device 101 may compute the ideal user fuel consumption and user score calculations. The comparison in step 303 may comprise a first comparison of the predicted fuel consumption of the model vehicle with a first vehicle configuration with the real fuel consumption of the vehicle 100 in operation, a second comparison of the predicted fuel consumption of the model vehicle with a second vehicle configuration with the real fuel consumption of the vehicle 100 in operation etc. The comparison in step 303 may comprise to compare the result of the first comparison and the second comparison to determine an indication of which vehicle configuration is associated with the lowest, best or required energy consumption. The comparison in step 203 may be done taken a driver behavior into account. With this, the device 101 may provide an indication of the effect of the vehicle configuration(s) for a specific driver behavior may be. The comparison may be done for one or multiple driving conditions, e.g. different weather conditions, vehicle load etc.

In step 304, the device 101 detects a discrepancy between the modelling data and the operating data, if present. The device 101 may also generate a trust model. An output of step 304 may be the ideal user fuel consumption, an action recommendation, user score and trust index (TI), i.e. what to work on in order to decrease fuel consumption in order to move towards an ideal user. The trust index, determined by the device 101, may be described as a measure which quantifies how much the action recommendation could be trusted and this may be based on the quality of each cluster of vehicles. See also FIGS. 11*a* and 11*b*. The ideal user may be generated using the digital model and based on the historic data of the vehicle fleet. An ML algorithm may be used when generating the ideal user. The output of step 304 may be an advise related to how to reduce or overcome the discrepancy, it may be information indicating an origin of the discrepancy etc. An output of step 304 may be an indication of which vehicle configuration is associated with the lowest, best or required energy consumption etc. Consequently, the device 101 may determine which features that may be added to the vehicle 100 and at the same time does not involve an energy consumption above a threshold. The result of step 304 may be an indication of what the energy consumption would have been and/or will be with the different vehicle configurations and for e.g. a certain driver behavior, with different driving conditions etc.

Figure 4A:
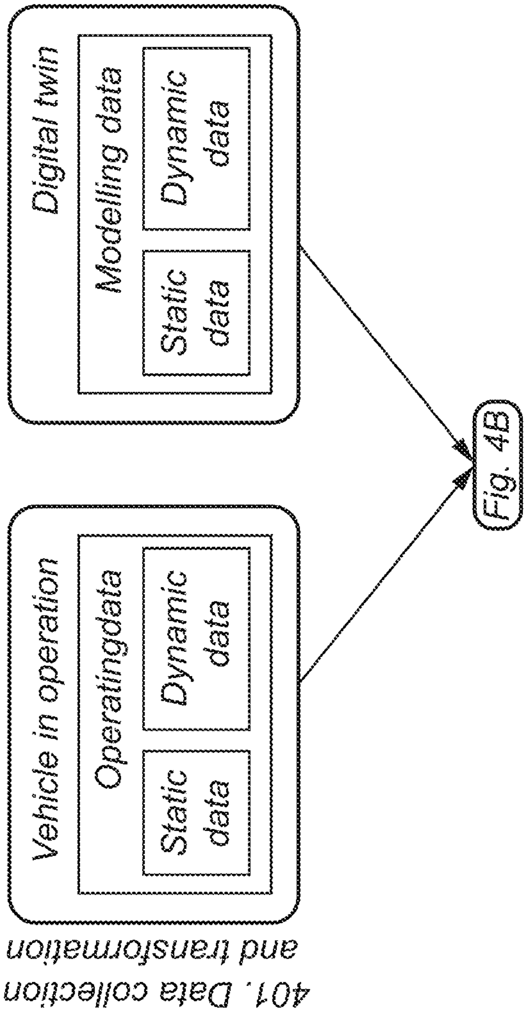
FIG. 4 is a flow chart illustrating a method.
Figure 4B:
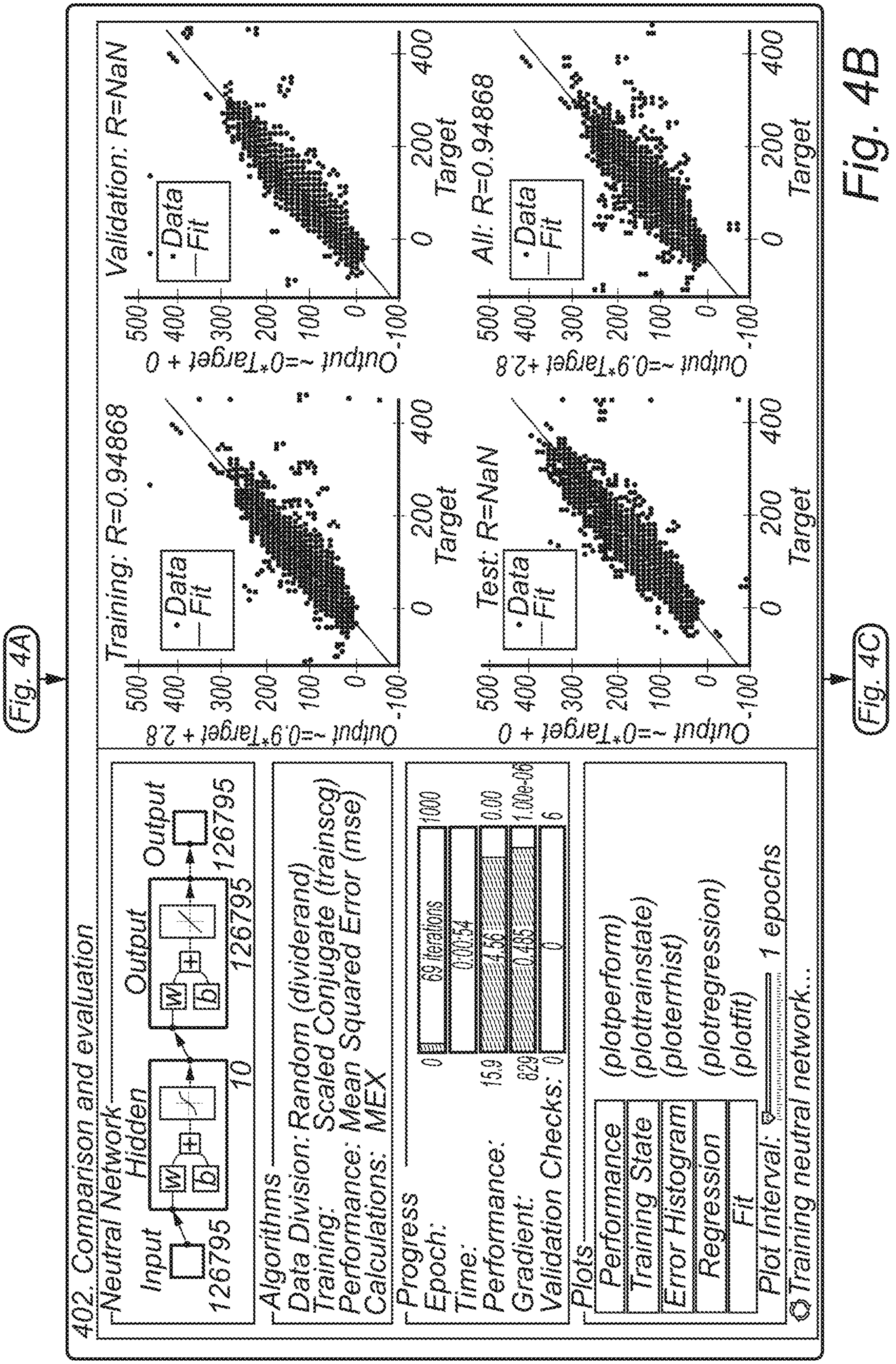
Figure 4C:
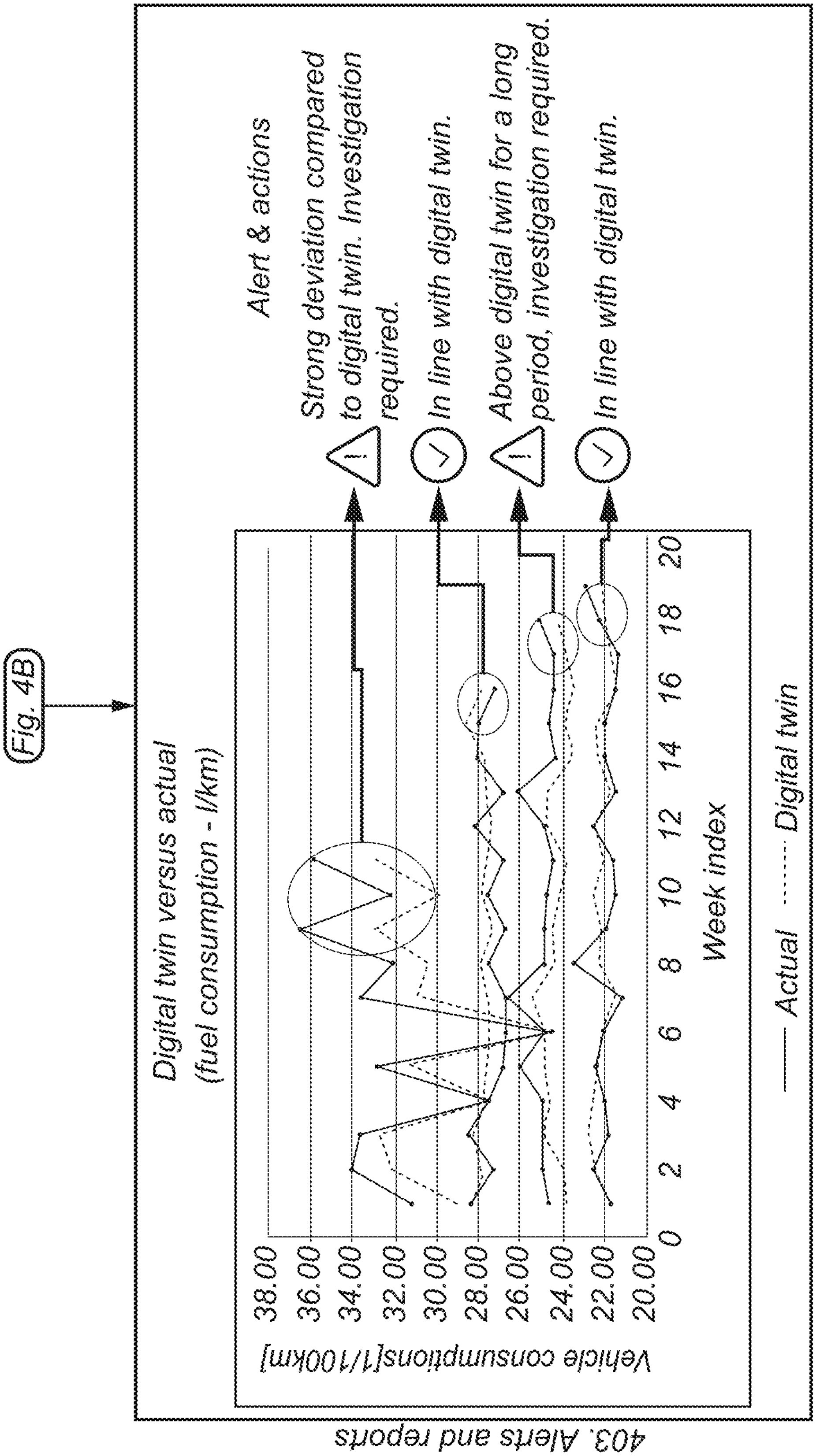

FIG. 4 is a flow chart illustrating a method performed by the device 101 for handling data associated with energy consumption of a vehicle 100 in operation. In step 401, the device 101 collects data and may transform the data. The transformation of the data may be to transform the data from one format to another format. The data may be operating data obtained from the vehicle in operation and it may be modelling data obtained from the digital twin. The operating data may comprise at least one of static data and dynamic data. The modelling data may comprise at least one of static data and dynamic data. The static data may be static in that they are not changed during operation of the vehicle 100. The dynamic data may be dynamic in that they vary during the operation of the vehicle 100. The static data may comprise one or more of:

Engine Power.

Reduction ratio.

Gearbox type.

Aerodynamics options.

The dynamic data may comprise one or more of:

Vehicle mileage.

User scores: cruise, eco-zone, idle, anticipation.

Average vehicle load.

Current topography or estimated topography, e.g. engine load above 90%.

Average driving speed.

Time spent in eco zone.

Time spent in cruise mode.

Time spent in automatic mode.

Time spent gearbox.

Braking activation/100 km.

Rebuilt average temperature average or actual temperature.

The current or estimated topography Refers to the topography of the road on which the vehicle currently drives on or is intended to drive on at a later time instance.

The modelling data may be a prediction of energy consumption of the model vehicle having different configurations, for example the start configuration, a later configuration, a changed configuration, a future configuration etc. Thus, modeling data for different vehicle configurations may be compared to determine which vehicle configuration which is associated with the lowest, best or required energy consumption of the vehicle 100.

In step 402, the device 101 performs comparison and evaluation of the modeling data and operating data. The comparison in step 402 may comprise a first comparison of the predicted fuel consumption of the model vehicle with a first vehicle configuration with the real fuel consumption of the vehicle 100 in operation, a second comparison of the predicted fuel consumption of the model vehicle with a second vehicle configuration with the real fuel consumption of the vehicle 100 in operation etc. The comparison in step 402 may comprise to compare the result of the first comparison and the second comparison to determine an indication of which vehicle configuration is associated with the lowest, best or required energy consumption. The comparison in step 203 may be done taken a driver behavior into account. With this, the device 101 may provide an indication of the effect of the vehicle configuration(s) for a specific driver behavior may be. The comparison may be done for one or multiple driving conditions, e.g. different weather conditions, vehicle load etc.

In step 403, the device 101 may trigger an operation, e.g. provide alerts and reports. As exemplified in FIG. 4, a report may illustrate the digital twin versus the actual vehicle. The solid line in the graph in step 403 represents the actual vehicle and the dotted line represents the digital twin. The graph illustrates an example of the fuel consumption of the digital twin versus the actual fuel consumption of the vehicle 100 in operation. The fuel consumption may be in l/km. Alerts and actions may be indicated, for example on a display accessible by the user or any other operator, which may be for example that there is a strong deviation of the actual vehicle compared to digital twin and that investigation is required. Another example may be that the fuel consumption of the actual vehicle is in line with the digital twin. A further example may be that the fuel consumption of the actual vehicle has been above the digital twin for a long period and that investigation is required. In step 403, the device 101 may provide an indication of which vehicle configuration is associated with the lowest, best or required energy consumption etc. Consequently, the device 101 may determine which features that may be added to the vehicle 100 and at the same time does not involve an energy consumption above a threshold. The result of step 304 may be an indication of what the energy consumption would have been and/or will be with the different vehicle configurations. The result of step 304 may be an indication of what the energy consumption would have been and/or will be with the different vehicle configurations and for e.g. a certain driver behavior, with different driving conditions etc.

The operation may comprise a root cause analysis that results in a root cause of the discrepancy or an indication of the root cause of the discrepancy.

Figure 5:
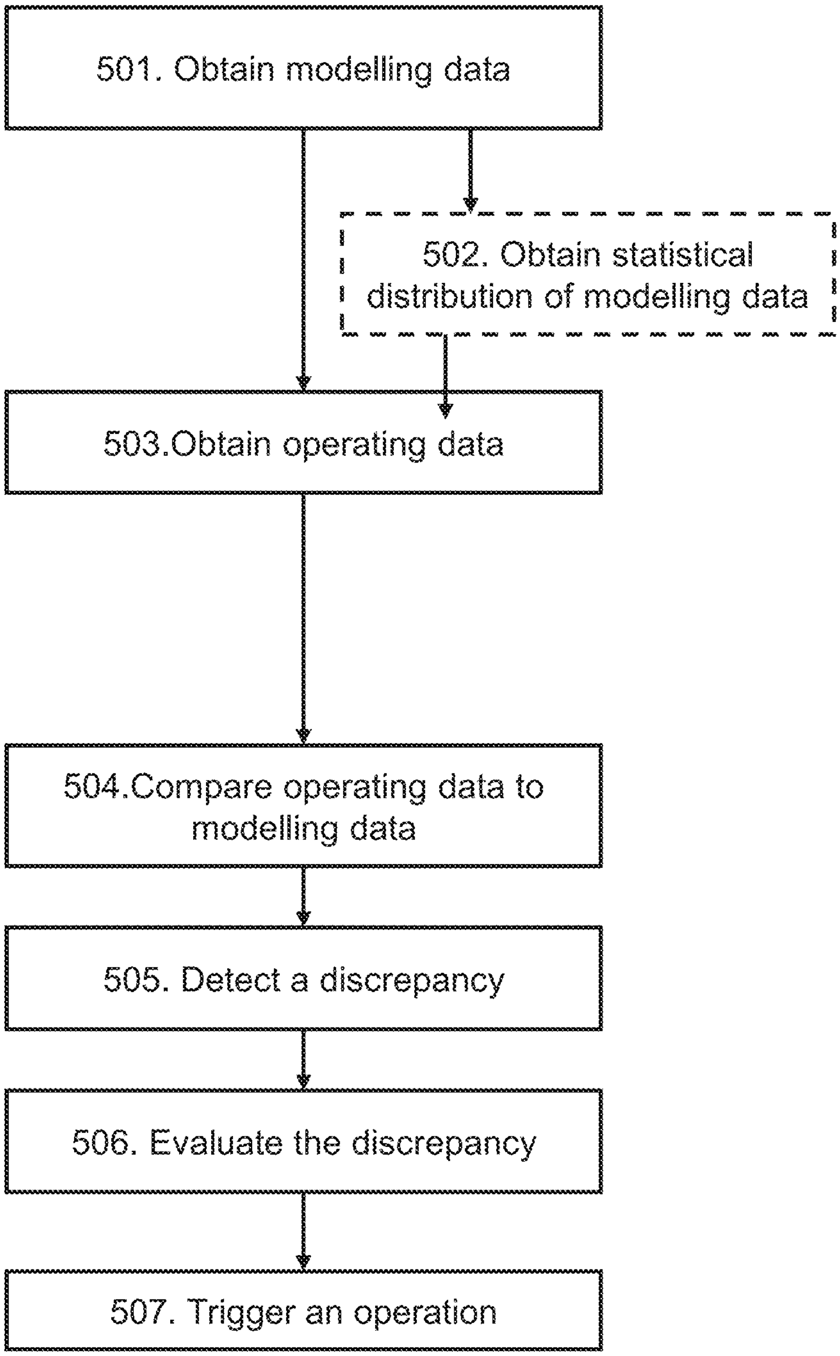
FIG. 5 is a flow chart illustrating a method.

The method described above will now be described seen from the perspective of the device 101. FIG. 5 is a flowchart describing the method in the device 101 for handling data associated with energy consumption of a vehicle 100 in operation. The method comprises at least one of the following steps to be performed by the device 101, which steps may be performed in any suitable order than described below:

Step 501

This step corresponds to step 201 in FIG. 2, step 301 in FIG. 3 and step 401 in FIG. 4. The device 101 obtains modelling data associated with energy consumption of a model vehicle. The modelling data are generated by a digital model of the vehicle 100 in operation. The modelling data may be generated based on historic operating data from a fleet of vehicles. The modelling data may comprise a predicted energy consumption for the model vehicle. The model vehicle may be an ideal vehicle, an average vehicle etc.

The digital model may be implemented on a remote server or in the vehicle 100.

The digital model may be configured based on historic operating data obtained from a fleet of vehicles. An ML algorithm may be used when configuring the digital model based on historic operating data. Using the ML algorithm provides advantage of increased efficiency of the method, reduced time consumption and increased accuracy of result and outputs, as compared to not using the ML algorithm. Vehicles comprised in the fleet of vehicles may have similar mission and configuration. The vehicles comprised in the fleet of vehicles may be selected 300, by the device 101, from a main fleet of vehicles comprising vehicles having both similar and different mission and configuration.

The modelling data may be a prediction of energy consumption of the model vehicle having different configurations, for example the start configuration, a later configuration, a changed configuration, a future configuration etc. Thus, modeling data for different vehicle configurations may be compared to determine which vehicle configuration which is associated with the lowest, best or required energy consumption of the vehicle 100. The modelling data may be for different users of the vehicle 100, it may be for different driving conditions etc. The configuration may comprise activated and deactivated actuators and/or sensors.

Step 502

This step corresponds to step 402 in FIG. 4. The device 101 may obtain a statistical distribution of the modelling data. For example, the device 101 may obtain an upper prediction and a lower prediction of the fuel consumption. Thus, a confidence interval of the predicted fuel consumption may be provided. See FIG. 8 for more details. The statistical distribution of the modelling data may be for one or more vehicle configurations, driver behaviours, driving conditions, activated actuators and/or sensors, deactivated actuators and/or sensors etc.

Step 503

This step corresponds to step 202 in FIG. 2, step 302 in FIG. 3 and step 401 in FIG. 4. The device 101 obtains operating data associated with energy consumption of the vehicle 100 in operation. The operating data may be real data, e.g. the real fuel consumption of the vehicle 100 in operation. The operating data may be obtained in real time, e.g. when the vehicle 100 is in operation, it may be obtained upon request from the device 101, it may be provided by the vehicle 101 at regular or irregular time intervals, it may be provided by the vehicle 101 when a certain operation is completed or has lasted for a period of time etc. The operating data may come from the trailers and body of the vehicle 100 in operation.

The modelling data in step 501 and the operating data in step 503 may be both based on static data and/or dynamic data.

Step 504

This step corresponds to step 203 in FIG. 2, step 303 in FIG. 3 and step 402 in FIG. 4. The device 101 compares the operating data to the modelling data. The comparison may provide a result which may indicate that the operating data and the modelling data are substantially the same, e.g. that they are the same with a tolerance, or the result may indicate that the operating data and the modelling data are substantially different, e.g. that there is a discrepancy between them.

Step 504 may comprise that the device 101 compares operating data to the statistical distribution of the modelling data to determine if the operating data is according to the statistical distribution or not.

The comparison in step 504 may comprise a first comparison of the predicted fuel consumption of the model vehicle with a first vehicle configuration with the real fuel consumption of the vehicle 100 in operation, a second comparison of the predicted fuel consumption of the model vehicle with a second vehicle configuration with the real fuel consumption of the vehicle 100 in operation etc. The comparison in step 504 may comprise to compare the result of the first comparison and the second comparison to determine an indication of which vehicle configuration is associated with the lowest, best or required energy consumption. The comparison in step 504 may be for different driver behaviors, different driving conditions, e.g. weather conditions, vehicle load etc.

Step 505

This step corresponds to step 204 in FIG. 2, step 304 in FIG. 3 and step 402 in FIG. 4. Based on a result of the comparing, the device 101 a discrepancy between the operating data and the modelling data and associated with the energy consumption. The discrepancy may be described as a difference, a deviation, etc.

Step 506

This step corresponds to step 205 in FIG. 2, step 304 in FIG. 3 and step 402 in FIG. 4. The device 101 evaluates the detected discrepancy associated with the energy consumption.

The evaluation may comprise one or more of:

evaluating energy consumption of the vehicle 100 in operation;

detecting malfunction of the vehicle 100 in operation;

determining a reason for the discrepancy;

determining a vehicle configuration change;

determining a vehicle operation change; and determining an optimal vehicle configuration.

Step 506 may comprise that the device 101 determines a user anticipation score for a user of the vehicle 100 in operation. I user anticipation score may be as follows:

user anticipation score ~

$$f\left(\frac{\text{w\_overall}}{W^{\alpha} * B^{\delta} * S^{\zeta}}\right),$$

where

W: weight impact ~$\alpha$*$w_{light}$+$\beta$+$w_{medium}$+$\gamma$*$w_{full}$ or an actual weight transported B: brake impact ~

$$\max\left(\frac{\text{brakes} - \text{stops}}{\text{stops}}, \text{brake\_max}\right)$$

S: speed impact ~

$$\frac{v - v_{min}}{v_{max} - v_{min}}$$

$\alpha$, $\beta$, $\gamma$, $\delta$, $\varepsilon$, $\zeta$, $w_{overall}$, brake_max: real value scalar parameters w_overall: overall weight brake_max: max limit for a brake impact

*f*: a normalized sigmoid function that maps any real value to a value between 0 and 1

$w_{light}$, $w_{medium}$, $w_{full}$: a ratio of km driven with light, medium and full weight load respectively v: an average speed and speeds outside $v_{min}$ or $v_{max}$ will be clipped to those values.

Step 506 may comprise that the device 101 determines a user eco score for a user of the vehicle 100 in operation. The user eco score may be as follows:

eco score ~

$$f\left(\frac{w_{overall} * W^{\eta}}{O^{\theta} * N^{\kappa} * S^{\mu}}\right),$$

where

W: weight impact ~$\alpha$*$w_{light}$+$\beta$+$w_{medium}$+$\gamma$*$w_{full}$ or actual weight transported O: overload impact ~

$$\frac{1}{\varphi} * \frac{\text{t\_overload}}{\text{t\_total}}$$

and/or topography impact.

N: not in green zone impact ~

$$\frac{1}{\xi} * (\max(\min\left(\frac{l_{notgreen} - l_{avg}}{l_{avg}}, 0\right), 1))$$

S: speed impact ~

$$\frac{v - v_{min}}{v_{max} - v_{min}}$$

$\eta$, $\theta$, $\kappa$, $\mu$, $\varphi$: real value scalar parameters.

$w_{overall}$: an overall weight.

$\varphi$, $\xi$: normalization factors.

*f*: a normalized sigmoid function that maps any real value to a value between 0 and 1.

$w_{light}$, $w_{medium}$, $w_{full}$: a ratio of km driven with light, medium and full weight, load respectively $$\frac{\text{t\_overload}}{\text{t\_total}}:$$

a ratio of time spent in overload.

l_notgreen: liters per 100 km spent above the green zone.

$l_{avg}$: liters per 100 km v: an average speed and speeds outside $v_{min}$ or $v_{max}$ will be clipped to those values.

Step 507

This step corresponds to step 205 in FIG. 2, step 304 in FIG. 3 and step 403 in FIG. 4. The device 101 triggers an operation when the discrepancy has been detected.

The operation may comprise one or more of:

providing information associated with the discrepancy; and/or triggering an alert; and/or initiating scheduling of a service operation; and/or requesting input from a user of the vehicle 100 in operation, and/or triggering or performing root cause analysis do determine the root cause of the discrepancy or to determine an indication of the root cause of the discrepancy.

The device 101 for handling a data associated with energy consumption of vehicles 100 is configured to perform the steps of the method according to at least one of FIGS. 2, 3, 4 and 5. To perform at least one of the method steps shown in at least one of FIGS. 2, 3, 4 and 5, the device 101 may comprise an arrangement as shown in FIG. 6.

Figure 6:
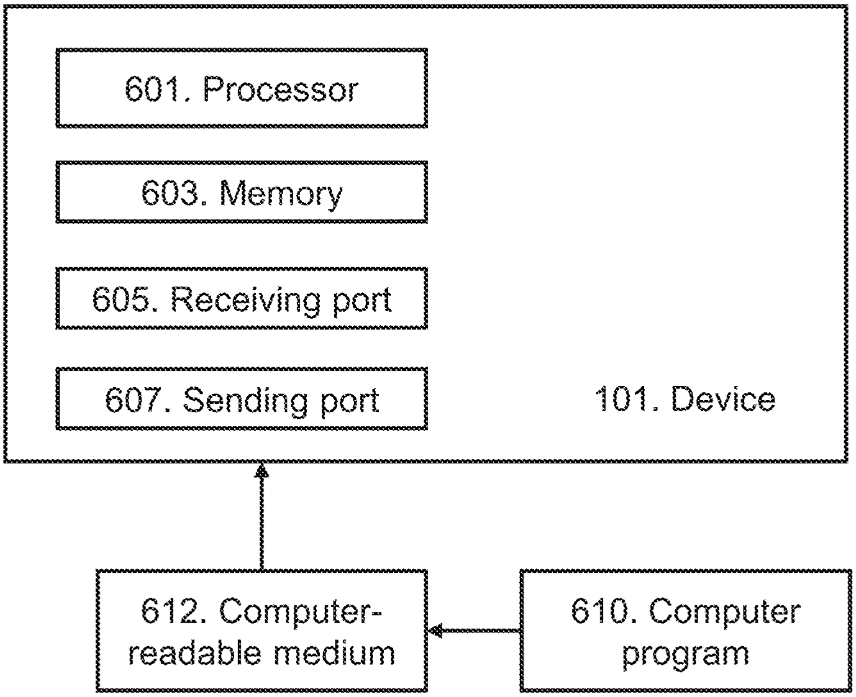
FIG. 6 is a schematic drawing illustrating a device.

The present invention related to the device 101 for may be implemented through one or more processors, such as a processor 601 in the device 101 for depicted in FIG. 6, together with computer program code for performing the functions and actions described herein. A processor, as used herein, may be understood to be a hardware component.

The program code mentioned above may also be provided as a computer program product, for instance in the form of a data carrier carrying computer program code for performing the present disclosure when being loaded into the device 101. One such carrier may be in the form of a CD ROM disc. It is however feasible with other data carriers such as a memory stick. The computer program code may be provided as pure program code on a server and downloaded to the device 101.

The device 101 may comprise a memory 603 comprising one or more memory units. The memory 603 is arranged to be used to store obtained data, modelling data, operating data, statistics, data, configurations, schedulings, and applications etc. to perform the methods herein when being executed in the device 101.

The device 101 may receive data and information from, e.g. the vehicle 100, vehicle fleet, through a receiving port 605. The receiving port 605 may be, for example, connected to one or more antennas in device 101. The device 101 may receive data from for example the vehicle 100 in operation, the vehicle fleet etc. Since the receiving port 601 may be in communication with the processor 601, the receiving port 605 may then send the received data to the processor 601. The receiving port 605 may also be configured to receive other data.

The processor 601 in the device 101 may be configured to transmit or send data to e.g. the vehicle 100, vehicle fleet, display or another structure, through a sending port 607, which may be in communication with the processor 601, and the memory 603.

Thus, the methods described herein for the device 101 may be respectively implemented by means of a computer program 610, comprising instructions, i.e., software code portions, which, when executed on at least one processor 601, cause the at least one processor 601 to carry out the actions described herein, as performed by the device 101. The computer program 610 product may be stored on a computer-readable medium 612. The computer-readable medium 612, having stored thereon the computer program 610, may comprise instructions which, when executed on at least one processor 601, cause the at least one processor 601 to carry out the actions described herein, as performed by the device 101. The computer-readable medium 612 may be a non-transitory computer-readable storage medium, such as a CD ROM disc, or a memory stick. The computer program 610 product may be stored on a carrier containing the computer program 610 just described, wherein the carrier is one of an electronic signal, optical signal, radio signal, or the computer-readable medium 612, as described above.

The vehicle 100 may comprise the device 101.

A computer program may comprise program code means for performing the steps of at least one of the methods in FIGS. 2, 3, 4 and 5 when the computer program is run on a computer.

A computer readable medium may carry a computer program comprising program code means for performing the steps of any of the steps of at least one of the methods in FIGS. 2, 3, 4 and 5 when the computer program is run on a computer.

As described earlier, the modelling data are generated by a digital model of the vehicle 100 in operation. The digital model may be a digital twin. The digital model may be referred to as an energy digital twin. The digital model may be a model built on real life data coming from vehicles in a vehicle fleet, e.g. historic real-life data from the vehicles in the vehicle fleet. The digital model may be configured using an ML algorithm. An example of the digital model is illustrated in FIG. 7. The digital model may comprise one or more of the following building blocks:

Standard related configuration

Ideal driving

Ideal vehicle configuration

Actuators digital win or actuator digital model.

Sensors digital twin or sensor digital model.

The building blocks may be described as a sub-model of the digital model, a function comprised in the digital model, a process comprised in the digital model etc. Even though FIG. 7 illustrates three separate building blocks, this may be only an example. The digital model may be one model adapted to perform the functions of each building block.

With the standard related configuration building block, the digital model may identify an anomaly linked to the vehicles and the associated equipment. The standard related configuration maybe associated with any suitable vehicle standard, e.g. ISO. With the standard related configuration, the device 101 may be able to detects discrepancies due to the equipment and identify a potential root cause.

With the ideal driving building block, the device 101 may be able to evaluate the potential of energy consumption reduction if the vehicle was driven ideally. With the ideal driving building block, the device 101 may be able to detect of improvements potentially linked to driving behaviour, e.g. anticipation, eco-zone etc. and propose an action plan. In other words, the operating data obtained from the vehicle 100 in operation may be compared to ideal driving of the vehicle. This may show a potential for improvement to motivate user of the vehicle and other vehicle related persons to focus on fuel consumption. Therefore, the device 101 may estimate the fuel consumption achievable for a given vehicle and mission, given an excellent user, e.g. an ideal user. The following operating data may be excluded from the use of the device 101:

total hours are less than 5 or more than 24*7 hours total km are less than 100 liters per 100 km are less than 20 and more than 66

The device 101 may quantify how to measure the user's performance and based on that assign a score to each vehicle. For example, a score between 0 and 1, with 1 indicating may an excellent user performance. Weekly operating data with the top driver performance, ex. top 10% of the population, may be selected by the device 101. An ideal driver model may be trained, e.g. using supervised modelling approach. Input to the ideal driver model may be non-driver related features, e.g. vehicle specifications, transport mission. Output of the ideal driver model may be fuel consumption, e.g. liters per 100 km. The device 101 may predict the fuel consumption for all vehicles and compare the predicted ideal fuel consumption with the actual value of the vehicle 101 in operation. The device 101 may make recommendations on what the user can improve in order to reach the ideal fuel consumption.

With the ideal vehicle configuration building block, the device 101 may be able to evaluate the potential of energy consumption reduction if the vehicle was driven ideally. With the ideal vehicle configuration building block, the device 101 may be able to indicate the right configuration based on vehicle mission. The device 101 may be adapted to provide energy service planning and root cause analysis. With the ideal vehicle configuration building block, the device 101 may be able to detect improvements linked to the vehicle configuration, for example axle ratio etc.

The ideal vehicle configuration may comprise one or more alternative vehicle configurations, possible vehicle configurations, future vehicle configurations etc. The ideal vehicle configuration may comprise a start vehicle configuration, i.e. the components comprised in the vehicle 100 when the vehicle 100 is new and dispatched from the vehicle manufacturing facility. The ideal vehicle configuration may comprise a possible for future vehicle configuration. With this, the device 101 may predict what the energy consumption benefit would have been with different vehicle configurations, for example by later adding components or features to the vehicle 100 in order to change or improve the energy consumption. The device 101 may predict the energy consumption with different vehicle configurations and in different driving conditions of a certain driver, for example road usage, driver capacity, load, weather etc. Examples of components or features that may be added to the vehicle 100 may be a roof deflector, a computer software etc.

Figure 8:
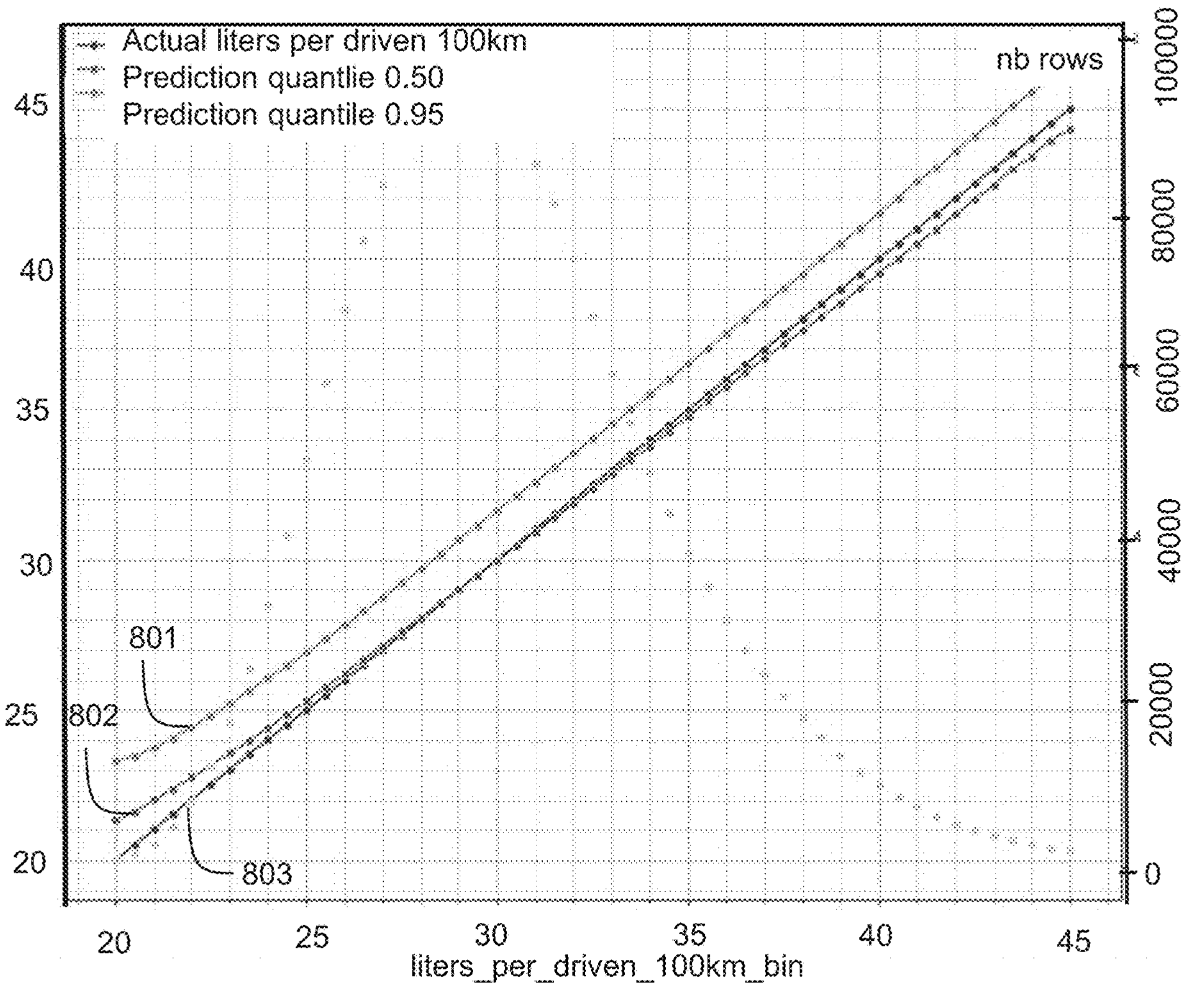
FIG. 8 is a graph illustrating a statistical analysis.

As mentioned in step 502 earlier, the device 101 may obtain a statistical distribution of the modelling data. FIG. 8 is a graph illustrating an example of such statistical distribution. The x-axis represents liters per driven 100 km. The top dotted line 801 represents the fuel consumption prediction quantile 0.95, the middle dotted line 802 represents the fuel consumption prediction quantile 0.5. The lower dotted line 803 represents the actual fuel consumption in liters per driven 100 km. The modelling data may be for one or more vehicle configurations, and possibly in combination with different driving conditions and further in combination with different users or drivers of the vehicle 100.

Figure 9:
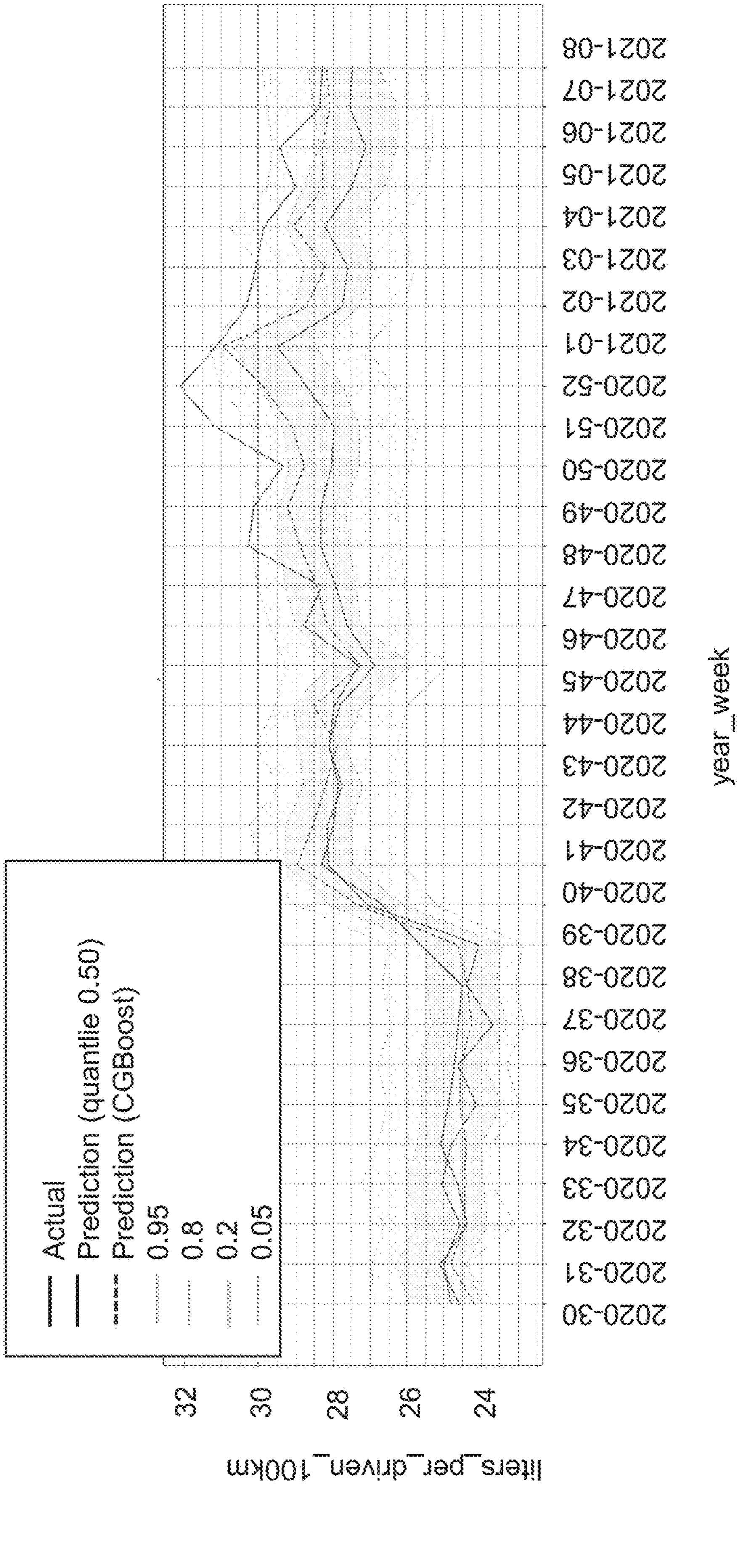
FIG. 9 is a graph illustrating a discrepancy and a trust area.

The trust model described earlier will now be described in more detail. FIG. 9 is a graph illustrating the discrepancy and the trust area.

Figure 10A:
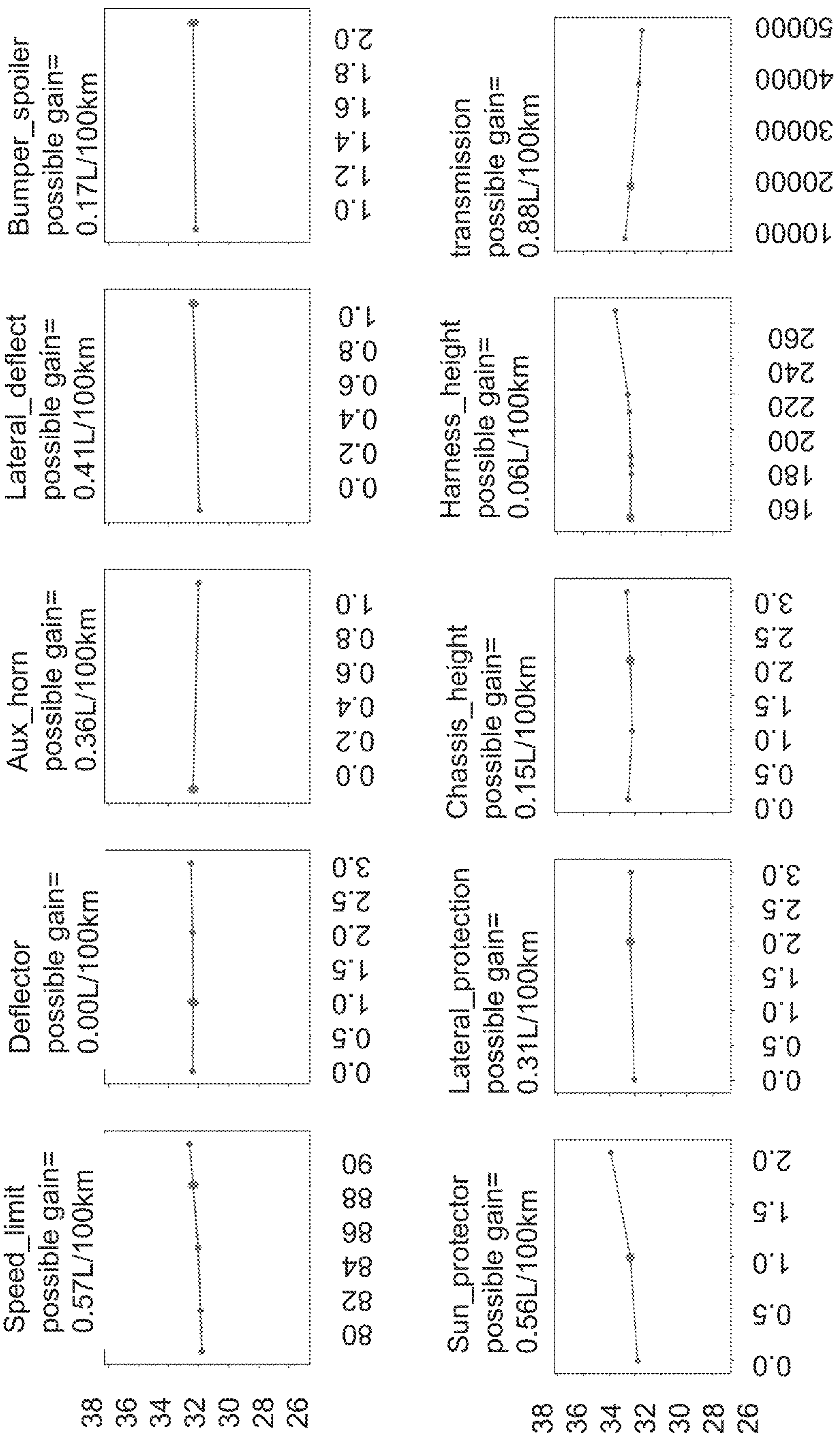
FIG. 10 are graphs used in root cause investigation.
Figure 10B:
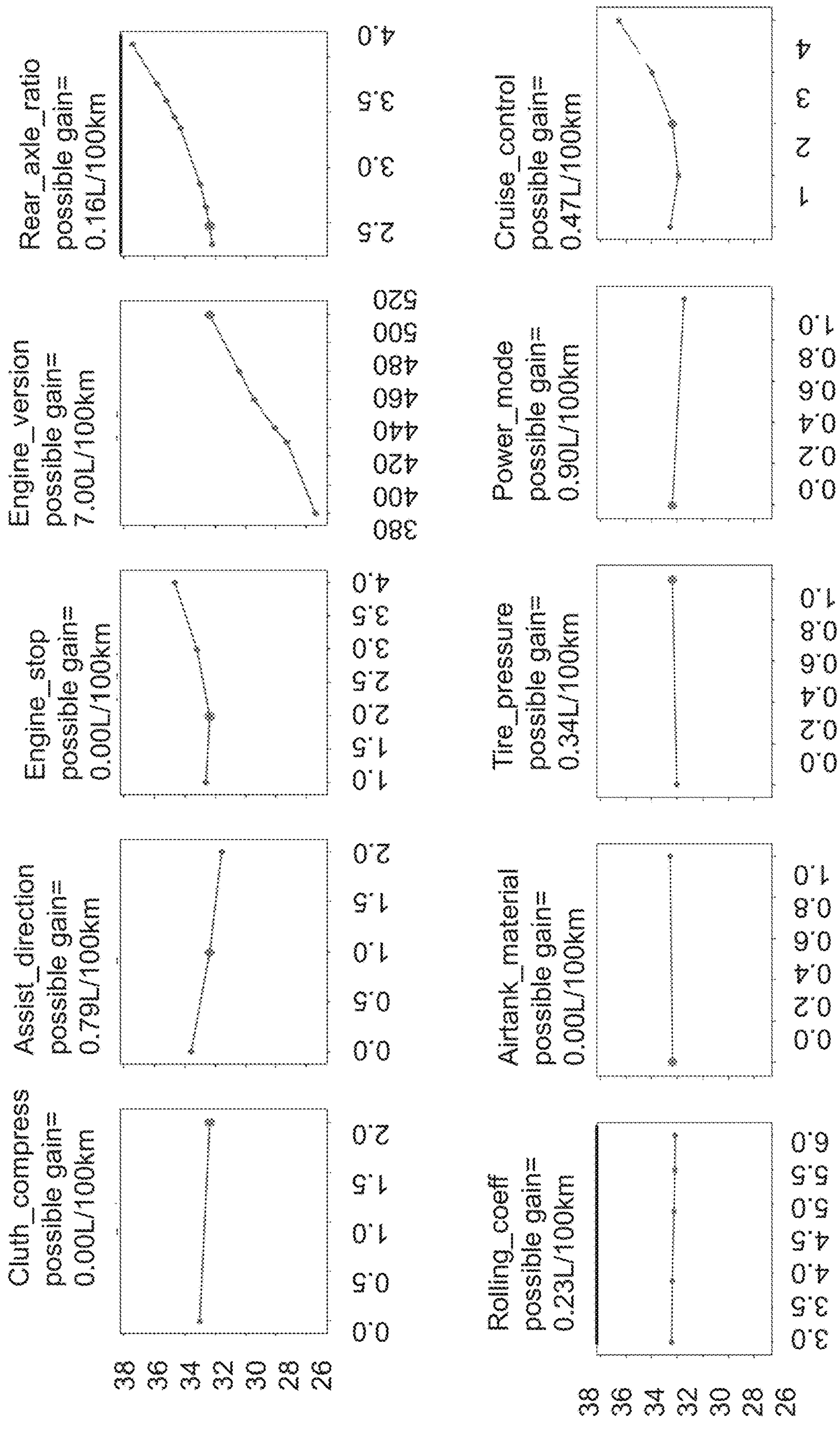

FIG. 10 are graphs exemplifying parameters that may be used in the evaluation, for example a in a root cause investigation. The device 101 may evaluate if the variant is ok or if it is going the wrong way.

Figure 11A:
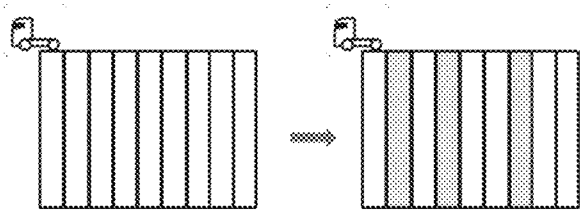
FIGS. 11*a* and 11*b* is a schematic drawing illustrating a method.
Figure 11A:
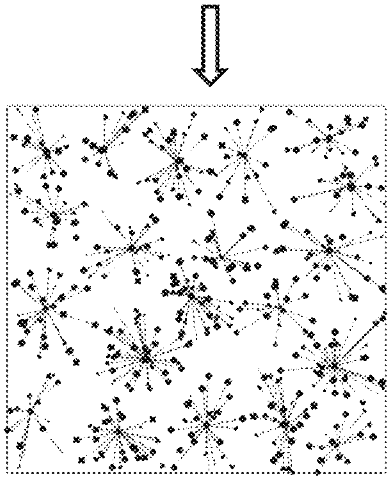
Figure 11A:
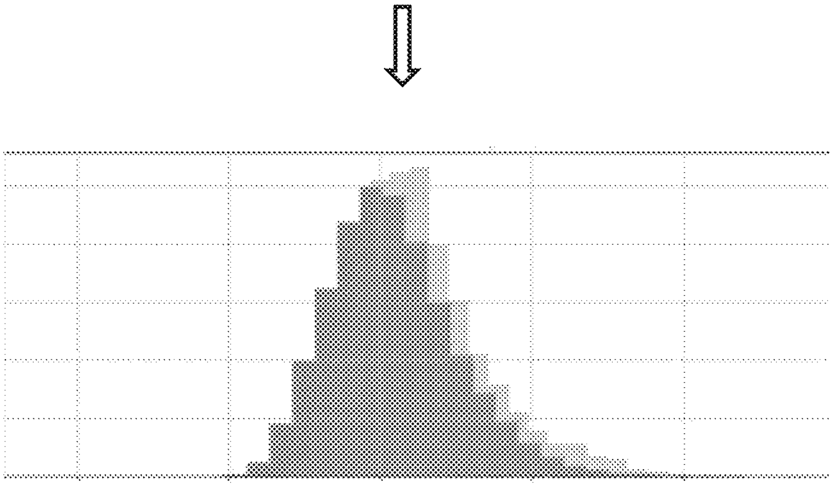
Figure 11B:
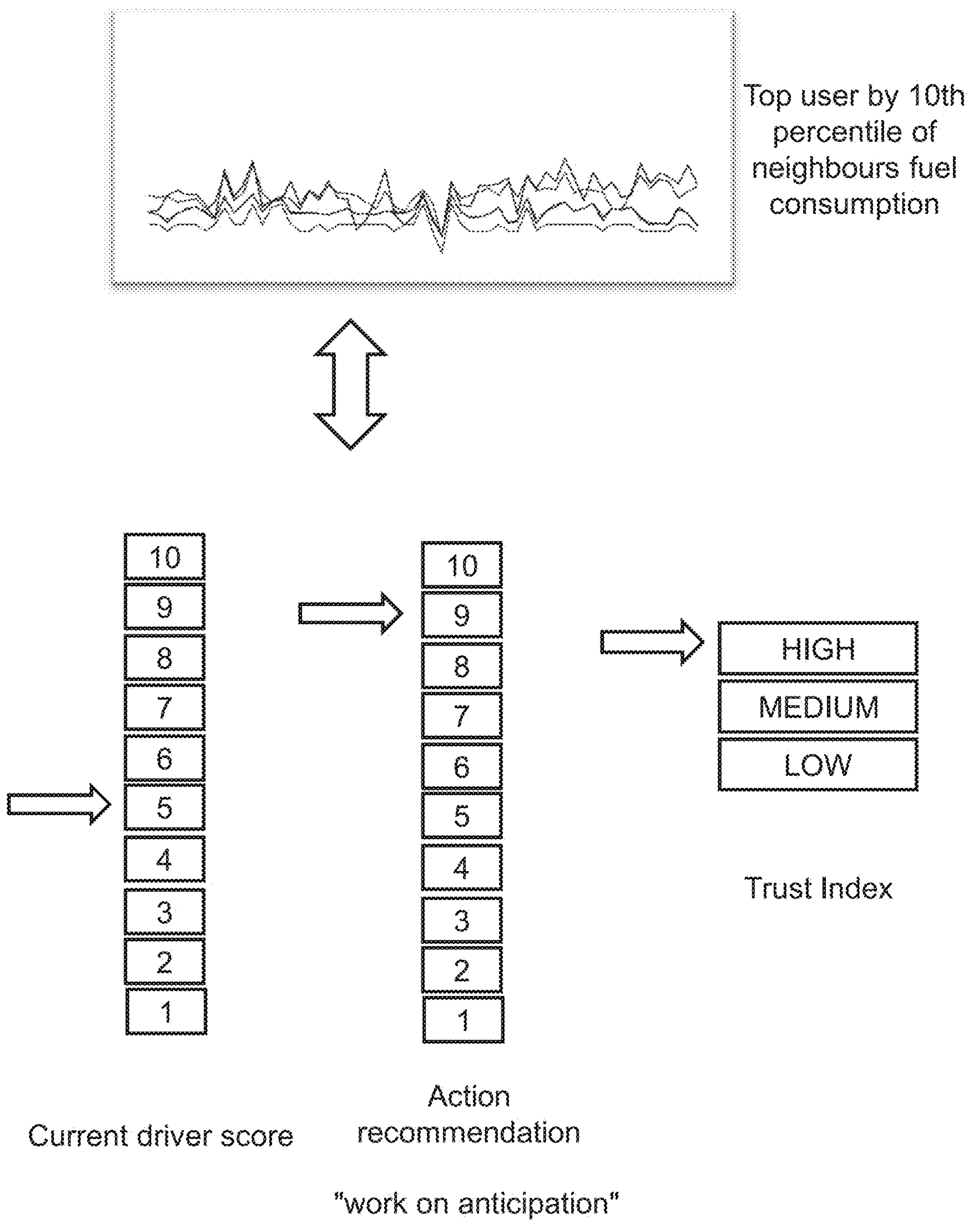

FIG. 11*a* illustrates the method for handling a data associated with energy consumption of a vehicle 100 in operation. Similar to step 300 in FIG. 3, the dimension of the main fleet of vehicles is reduced, as seen in the top part of FIG. 11*a*. The middle part of FIG. 11*a* illustrates that a clustering may be performed. The bottom part of FIG. 11*a* illustrates cluster statistics and modelling. FIG. 11*b* illustrates a result of the method exemplified in FIG. 11*a*. The graph in FIG. 11*b* illustrates the top driver by 10th percentile of neighbours fuel consumption. From the graph, a current user score may be provided for example in the form of a score on a scale from 1-10. The user score is exemplified to be 5 in FIG. 11*b*. From the user score, an action recommendation may be provided. At the end, a trust index may be provided. The user score is exemplified to be 9 in FIG. 11*b*. The trust index, also described in FIG. 3, may be for example on a scale ranging from high, medium to low. The trust index is exemplified to be high in FIG. 11*b*.

The user anticipation score and the user eco score will now be described in more detail.

A top user may be selected based on the user anticipation score. A parameter set search may have been performed by the device 101 to make sure that the top user selection is representative of the complete population and is not biased by the vehicle's transport mission. Top users may be defined as users with anticipation score higher that 0.85 and less than 1, e.g. approximately 6% of the population. The device 101 may compare the characteristics of the top users to the remaining drivers in the population. Top users may have a good coverage of the different transport missions when looking at the average speed, weight and number of stops. Top users may have a significant lower average number of brakes per stop. Top users may consume less fuel and spent less time in overload than the remaining users.

A top user may be selected based on the user eco score. The device 101 may have performed a parameter set search to make sure that the top user selection is representative of the complete population and is not biased by the vehicle's transport mission. Top users may be defined as users with score higher that 0.8, e.g. approximately 8.5% of the population. The device 101 may compare the characteristics of the top users to the remaining users in the population. Top users may have a good coverage of the different transport missions when looking at the average speed, weight and number of stops. Top users may have spent less fuel in engine above the green zone than the remaining users. Top users may consume less fuel in general and spent less time in overload than the remaining users.

As mentioned above, digital model may be configured based on historic operating data obtained from a fleet of vehicles and an ML algorithm may be used when configuring the digital model. In other words, the digital model may be built by digesting historic operating data. Without using ML, too high energy consumption for a given vehicle 100 may be detected by finding similar vehicles with similar usage and similar driver behaviour and perform the comparison between the given vehicle and the similar vehicles. But this method is not efficient at all, it is time consuming and not precise. There is a large number of inputs, e.g. 80, influencing the energy consumption of a vehicle 100. Due to the large amount of input, the more sorted the inputs to be matched to the vehicle will be, and the less vehicles will be available to compare with, and it also leads to reduced confidence in the comparison that becomes statistically not strong. While using machine learning helps to keep all vehicles to compare with. ML may be described as a type of artificial intelligence (AI). With ML, the method described herein has increased accuracy in for example evaluating energy consumption of the vehicle.

Using ML to configure the digital model based on historic operating data may comprise one or more of the following steps:

Step 1): Selecting and preparing a training data set. The training data set may be data collected from the fleet of vehicles. The training data set may be the historic operating data from the fleet of vehicles. This data may be used to feed the Machine Learning model to learn the vehicle energy consumption.

Step 2): Selecting a ML algorithm to run on the training data set. The type of ML algorithm may be neural networks, local linear model trees etc.

Step 3) Training the ML algorithm selected in step 2). The training of the ML algorithm is an iterative process. Variables are run through the ML algorithm, and the results are compared with those it should have produced. The "weights" and bias may then be adjusted to increase the accuracy of the result. The variables are then run again until the ML algorithm produces the correct result most of the time, i.e. above a threshold. The algorithm, thus trained, is the Machine Learning model also called energy consumption digital twin.

By using Machine Learning, the following advantages may be obtained:

- Reducing the time required to detect an actuators consumption anomaly crossing mission, driver behavior and truck configuration data, an/or
- Proposing a root cause analysis and associated improvements, and/or
- Following an action plan implementation to identify validity of the alert.

As mentioned earlier, the vehicle 100 may be equipped with many actuators and sensors to provide features. The actuators and sensors are comprised in vehicle configurations. Some examples of actuators are:

- A fan in front of the vehicle 100 to promote heat dissipation in cooler and engine compartment.
- An air compressor feeding the vehicle 100 with compressed air used for engine brakes, door opening, urea spray quality, blow gun in the cabin.
- An air conditioning compressor
- A power steering pump
- An oil pump etc.

These exemplified actuators may be driven or operated by energy coming from the vehicle's engine crankshaft. The more of these actuators that are activated, the more energy is consumed by the vehicle 100.

Monitoring when these actuators are activated, the intensity of activation, for example in case of variable flow air compressor, and the duration of this activation, when these actuators can be switched off, is necessary to maintain the energy consumption at a minimum level.

Monitoring activation of the actuators with respect to energy consumption is possible thanks to the connected vehicle 100 that allows to obtain operational data on a regular basis, e.g. weekly, daily to minute. In regard of the volume of generated data, the number of factors influencing the activation of the actuators and then energy consumption, e.g. mission, driver behavior, truck configuration, trailers, tires, etc, it is complex and time consuming to detect discrepancies and determine the root cause of too high, too low or too intense actuator activation, leading to waste in energy consumption at the vehicle level.

An actuator digital model such as an actuator digital twin may be a digital model built on real life data coming from vehicles in operation. An anomaly linked to the vehicle and the associated component, e.g. the actuator, may be identified. By comparing the actuator energy consumption given by the modelling data, e.g. the digital twin model, and the operating data for the actual actuator energy consumption, for example as a function of actuator activation duration and/or intensity, from the vehicle 100, it is possible to determine discrepancies, e.g. too long or not enough long air compressor activation and then energy consumption compared to what is should on a normal vehicle 100. Too long air compressor activation leading to cost for the vehicle operator as it will also increase the energy consumption of the vehicle, e.g. it's powertrain. Too long air compressor activation could also be linked to a leakage in the air circuit used for engine brakes for instance.

The vehicles 100 are also equipped with one or more sensors. Some examples of sensors are:

- Oil temperature sensor.
- Oil pressure sensor.
- Boost pressure pression sensor.
- Boost pressure temperature sensor.
- Exhaust Gas Recirculation flow meter/sensor.
- Inlet air flow meter/sensor.
- Etc.

Like for actuators, based on historic data coming from the vehicle 100, it is possible to obtain modelling data, e.g. using a digital model such as a digital twin, of the sensor output, e.g. temperature, pressure etc., and to compare the modelling data with the operating data, e.g. the actual temperature coming from the temperature sensor.

Thus, in case of discrepancy between the modelling data for the sensor, i.e. the sensor digital twin, and the operating data of the sensor, i.e. the actual sensor signal, it is possible to detect a sensor failure or a leakage in for example a fluid.

Summarized, the present invention relates to reducing the time required to detect an energy anomaly crossing mission, user behavior and truck configuration data. It enables root cause analysis and associated improvements. The present invention enables improving user scoring and following action plan implementation to identify validity of the alert.

The device 101 may predict what the energy consumption benefit would have been and/or what it will be by adding an option to the vehicle 100 that was not included in the vehicle 100 definition from the start out of the factory: for example, a roof deflector or a software in the exact driving conditions of a given user, e.g. road usage, driver capacity, load, weather. The device 101 may predict the energy consumption of a route or trip done by the vehicle 100, considering different vehicle configurations, vehicle driving conditions and a user behavior.

With the present invention, vehicle fuel monitoring may be provided. In case of deviation, a user of the vehicle or any other suitable person may be alerted and an improvement action plan may be provided. This may make the life of vehicle fleet manager easier.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It is to be understood that the present invention is not limited to the embodiments described above and illustrated in the drawings; rather, the skilled person will recognize that many changes and modifications may be made within the scope of the appended claims.

The invention claimed is:

1. A method performed by a device for handling data associated with energy consumption of a vehicle in operation, the method comprising:

obtaining modelling data associated with energy consumption of a model vehicle, wherein the modelling data are generated by a digital model of the vehicle in operation, using a machine learning algorithm trained on historic operating data obtained from a fleet of vehicles;

obtaining operating data associated with energy consumption of the vehicle in operation;

comparing the operating data to the modelling data;

based on a result of the comparing, detecting a discrepancy between the operating data and the modelling data and associated with the energy consumption;

evaluating the detected discrepancy associated with the energy consumption, wherein the evaluating comprises performing a root cause analysis to determine a source of the detected discrepancy; and triggering an operation when the discrepancy has been detected.

2. The method according to claim 1, wherein the evaluating the detected discrepancy associated with the energy consumption comprises one or more of:

evaluating energy consumption of the vehicle in operation;

detecting malfunction of the vehicle in operation;

determining a reason for the discrepancy;

determining a vehicle configuration change; and determining a vehicle operation change.

3. The method according to either of claim 1, wherein the operation comprises one or more of:

providing information associated with the discrepancy;

triggering an alert;

initiating scheduling of a service operation; and requesting input from a user of the vehicle in operation.

4. The method according to claim 1, wherein the modelling data and the operating data are both based on static data and/or dynamic data.

5. The method according to claim 1, comprising:

obtaining a statistical distribution of the modelling data; and wherein the comparing the operating data to the modelling data comprises:

comparing operating data to the statistical distribution of the modelling data to determine if the operating data is according to the statistical distribution or not.

6. The method according to claim 1, wherein the evaluating the detected discrepancy associated with the energy consumption comprises:

determining a user anticipation score for a user of the vehicle in operation, wherein the user anticipation score is:

user anticipation score ~

$$f\left(\frac{\text{w\_overall}}{W^{\alpha}, B^{\delta}, S^{\zeta}}\right),$$

where

W: weight impact $\sim\alpha * w_{light} + \beta * w_{medium} + \gamma * w_{full}$ or an actual weight transported B: brake impact $$\max\left(\frac{\text{brakes} - \text{stops}}{\text{stops}}, \text{brake\_max}\right)$$

S: speed impact ~

$$\frac{v - v_{min}}{v_{max} - v_{min}}$$

α, β, γ, δ, ε, ζ, $w_{overall}$, brake_max: real value scalar parameters w_overall: overall weight brake_max: max limit for a brake impact θ: a normalized sigmoid function that maps any real value to a value between 0 and 1

$w_{light}$, $w_{medium}$, $w_{full}$: a ratio of km driven with light, medium and full weight load respectively:

v: an average speed and speeds outside $v_{min}$ or $v_{max}$ will be clipped to those values.

7. The method according to claim 1, wherein the evaluating the detected discrepancy associated with the energy consumption comprises:

determining a user eco score for a user of the vehicle in operation, wherein the user eco score is:

eco score ~

$$f\left(\frac{w_{overall} * W^{\eta}}{O^{\theta} * N^{\kappa} * S^{\mu}}\right),$$

where

W: weight impact $\sim\alpha * w_{light} + \beta * w_{medium} + \gamma * w_{full}$ or actual weight transported O: overload impact ~

$$\frac{1}{\varphi} * \frac{t\_overload}{t\_total}$$

and/or topography impact,

N: not in green zone impact ~

$$\frac{1}{\xi} * (\max(\min\left(\frac{l_{notgreen} - l_{avg}}{l_{avg}}, 0\right), 1))$$

S: speed impact ~

$$\frac{v - v_{min}}{v_{max} - v_{min}}$$

η, θ, κ, μ, φ:real value scalar parameters $W_{overall}$: an overall weight

φ, ξ: normalization factors $f$: a normalized sigmoid function that maps any real value to a value between 0 and 1

$w_{light}$, $w_{medium}$, $w_{full}$: a ratio of km driven with light, medium and full weight load respectively $$\frac{t\_overload}{t\_total}:$$

a ratio of time spent in overload l_notgreen: liters per 100 km spent above the green zone:

$l_{avg}$: liters per 100 km:

v: an average speed and speeds outside $v_{min}$ or $v_{max}$ will be clipped to those values.

8. The method according to claim 1, wherein the digital model is implemented on a remote server or in the vehicle.

9. The method according to claim 1, wherein the digital model is configured based on historic operating data obtained from a fleet of vehicles.

10. The method according to claim 9, wherein vehicles comprised in the fleet of vehicles have similar mission and configuration.

11. The method according to claim 9, wherein the vehicles comprised in the fleet of vehicles are selected from a main fleet of vehicles comprising vehicles having both similar and different mission and configuration.

12. A device for handling a data associated with energy consumption of vehicles, the device being configured to perform the steps of the method according to claim 1.

13. A vehicle comprising a device according to claim 12.

14. A non-transitory computer readable medium carrying a computer program comprising program code for performing the steps of claim 1 when the computer program is run on a computer.

* * * * *